United States Patent [19]

Taga et al.

[11] Patent Number: 5,873,801

[45] Date of Patent: *Feb. 23, 1999

[54] POWER OUTPUT APPARATUS AND METHOD OF CONTROLLING THE SAME

[75] Inventors: Yoshiaki Taga, Aichi-ken; Eiji Yamada, Owariasahi; Takao Miyatani, Toyota; Yasutomo Kawabata, Aichi-ken, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 639,438

[22] Filed: Apr. 29, 1996

[30] Foreign Application Priority Data

May 19, 1995 [JP] Japan ................................ 7-145575
Dec. 15, 1995 [JP] Japan ................................ 7-347862

[51] Int. Cl.⁶ .................................................. B60K 41/02
[52] U.S. Cl. .................................. 477/5; 477/8; 477/13; 60/718
[58] Field of Search ........................ 477/5, 7, 8, 12, 477/13, 14; 60/716, 718; 310/750, 92, 103, 105, 114

[56] References Cited

U.S. PATENT DOCUMENTS

| 2,429,425 | 10/1947 | Nardone ............................ 477/12 X |
| 3,623,568 | 11/1971 | Mori . |
| 3,683,249 | 8/1972 | Shibata . |
| 3,789,281 | 1/1974 | Shibata . |
| 4,148,192 | 4/1979 | Cummings ............................ 60/716 |
| 4,577,738 | 3/1986 | Yater ................................. 477/5 X |
| 4,578,955 | 4/1986 | Medina .............................. 60/718 X |
| 4,715,491 | 12/1987 | Elderton ............................. 477/7 X |
| 5,285,111 | 2/1994 | Sherman ............................ 477/3 X |
| 5,415,603 | 5/1995 | Tuzuki et al. ........................ 477/5 |
| 5,513,719 | 5/1996 | Moroto et al. ..................... 60/718 X |
| 5,558,595 | 9/1996 | Schmidt et al. ....................... 477/3 |
| 5,562,565 | 10/1996 | Moroto et al. ..................... 477/8 X |

FOREIGN PATENT DOCUMENTS

| 58401/73 | 1/1975 | Australia . |
| 0 725 474 | 8/1996 | European Pat. Off. . |
| 29 28 770 | 1/1981 | Germany . |
| 49-43311 | 4/1974 | Japan . |
| 53-133814 | 11/1978 | Japan . |
| 55-103100 | 8/1980 | Japan . |
| 1193965 | 6/1970 | United Kingdom . |
| 2278242 | 11/1994 | United Kingdom . |

*Primary Examiner*—Charles A. Marmor
*Assistant Examiner*—Peter T. Kwon
*Attorney, Agent, or Firm*—Oliff & Berridge PLC

[57] ABSTRACT

A power output apparatus (20) includes an engine (50), a clutch motor (30) connecting with a crankshaft (56), an assist motor (40) connecting with a drive shaft (22), and a controller (80) for controlling the clutch motor (30) and the assist motor (40). When an electrical angle of the rotors in the clutch motor (30) is equal to π/2, a constant current is made to flow through three-phase coils (36) of the clutch motor (30) in order to enable a torque equal to or greater than a maximum torque ripple of the engine (50) to be applied from the clutch motor (30) to a drive shaft (22) and the crankshaft (56). This locks up an outer rotor (32) and an inner rotor (34) of the clutch motor (30). This structure enables the torque and rotation of the engine (50) to be directly transmitted to the drive shaft (22) at a high efficiency.

21 Claims, 16 Drawing Sheets

POWER OUTPUT APPARATUS AND METHOD OF CONTROLLING THE SAME

BACKGROUND OF THE INVENTION

1. Field of the Invention

The present invention generally relates to a power output apparatus and a method of controlling the same. More specifically, the invention pertains to a power output apparatus for outputting or utilizing power generated by an engine at a high efficiency and a method of controlling such a power output apparatus.

2. Description of the Related Art

In proposed power output apparatuses mounted on a vehicle, an output shaft of an engine is electromagnetically connected to a drive shaft linked with a rotor of a motor via an electromagnetic coupling, so that power of the engine is transmitted to the drive shaft (as disclosed in, for example, JAPANESE PATENT LAYING-OPEN GAZETTE No. 53-133814). When the revolving speed of the motor, which starts driving the vehicle, reaches a predetermined level, the proposed power output apparatus supplies an exciting current to the electromagnetic coupling in order to crank the engine, and subsequently carries out fuel injection into the engine as well as spark ignition, thereby starting the engine. After the engine is started, the power output from the engine is transmitted to the drive shaft via the electromagnetic coupling in order to continue driving the vehicle. The motor is activated when the power transmitted to the drive shaft via the electromagnetic coupling is not sufficient for the power required on the drive shaft, and makes up for the insufficiency. The electromagnetic coupling regenerates electric power corresponding to a slip of the electromagnetic connection, while the power is transmitted to the drive shaft. The electric power regenerated by the electromagnetic coupling is stored in a battery as electric power for starting the vehicle or used as power of the motor to make up for the insufficiency in power of the drive shaft.

In such conventional power output apparatuses, the power output from the engine is transmitted to the drive shaft on the assumption that the electromagnetic coupling regenerates electric power corresponding to a slip of the electromagnetic connection. It is accordingly impossible to directly transmit the output power of the engine to the drive shaft. The assumption that the electromagnetic coupling regenerates electric power corresponding to a slip of the electromagnetic connection implies that the revolving speed of the engine is always greater than the revolving speed of the drive shaft. The engine can thus not be driven at a revolving speed identical with the revolving speed of the drive shaft. This may cause non-required large power to be output from the engine.

SUMMARY OF THE INVENTION

The object of the present invention is thus to output power generated by an engine to a drive shaft at a higher efficiency.

Another object of the present invention is to directly transmit the output power of the engine to the drive shaft according to the requirements.

The above and the other related objects of the present invention are realized at leastly by a first power output apparatus for outputting power to a drive shaft. The first power output apparatus comprises: an engine having an output shaft; a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; a clutch motor-driving circuit for controlling a degree of electromagnetic connection of the first rotor and the second rotor in the clutch motor and regulating the rotation of the second rotor relative to the first rotor; and lock-up state control means for controlling the clutch motor via the clutch motor-driving circuit, in order to make the clutch motor in a lock-up state wherein the second rotor is not rotated relative to the first rotor.

The first power output apparatus of the invention can make the clutch motor fall in the lock-up state wherein the relative rotation of the second rotor to the first rotor is not allowed. This structure enables the power output from the engine to be directly transmitted to the drive shaft.

In accordance with one aspect of the present invention, the first power output apparatus further comprises: drive shaft revolving speed measuring means for measuring a revolving speed of the drive shaft; target torque setting means for setting a target torque, which is applied to the drive shaft, based on an instruction of a driver; and determination means for determining whether a combination of the revolving speed of the drive shaft measured by the drive shaft revolving speed measuring means and the target torque set by the target torque setting means is a combination within a predetermined range. In this structure, the lock-up state control means comprises means for controlling the clutch motor via the clutch motor-driving circuit, in order to make the clutch motor in a lock-up state wherein the second rotor is not rotated relative to the first rotor, when it is determined by the determination means that the combination of the revolving speed of the drive shaft and the target torque is a combination within a predetermined range. The combination of the predetermined range may be a combination of a revolving speed and a torque which can be stably output from the engine to the output shaft of the engine.

In accordance with another aspect of the present invention, the first power output apparatus further comprises: electric power regeneration means arranged on the drive shaft for regenerating electric power via the drive shaft. In this structure, the lock-up state control means comprises means for controlling the electric power regeneration means, in order to allow the electric power regenerated by the electric power regeneration means to compensate for at least part of electric power required for the control of the clutch motor.

In accordance with still another aspect of the present invention, the first power output apparatus further comprises: electric power regeneration means arranged on the output shaft of the engine for regenerating electric power via the output shaft. In this structure, the lock-up state control means comprises means for controlling the electric power regeneration means, in order to allow the electric power regenerated by the electric power regeneration means to compensate for at least part of electric power required for the control of the clutch motor.

In accordance with further aspect of the present invention, the first power output apparatus further comprises: an assist motor connected with the drive shaft; an assist motor-driving circuit for driving and controlling the assist motor; a storage battery being charged with electric power regenerated by the assist motor via the assist motor-driving circuit and discharging electric power required to drive the assist motor via the assist motor-driving circuit; target torque setting means for setting a target torque, which is applied to the drive shaft, based on an instruction of a driver; drive shaft revolving speed measuring means for measuring a revolving speed of the drive shaft; engine driving torque setting means for setting a driving torque of the engine based on the revolving speed of the drive shaft measured by the drive shaft revolving speed measuring means and the target torque set by the target torque setting means; engine drive control means for controlling the engine so as to allow the engine to be driven with the driving torque set by the engine driving torque setting means; and additional torque control means for controlling the assist motor via the assist motor-driving circuit by utilizing charge and discharge electric power of the storage battery, in order to enable a torque expressed as a difference between the target torque set by the target torque setting means and the driving torque set by the engine driving torque setting means to be applied to the drive shaft by the assist motor. The first power output apparatus of this preferred structure enables the assist motor to apply the torque, which corresponds to the difference between the target torque and the driving torque set by engine driving torque setting means, to the drive shaft. The torque acting on the drive shaft thus becomes substantially equal to the target torque. As long as the revolving speed of the engine coincides with the revolving speed of the drive shaft, it is not necessary to make the torque output from the engine coincide with the torque required for the drive shaft. In accordance with one aspect of this structure, the first power output apparatus further comprises: determination means for determining whether the revolving speed of the drive shaft measured by the drive shaft revolving speed measuring means is within a predetermined range. In this structure, the lock-up state control means comprises means for controlling the clutch motor via the clutch motor-driving circuit, in order to make the clutch motor in a lock-up state wherein the second rotor is not rotated relative to the first rotor, when it is determined by the determination means that the revolving speed of the drive shaft is within a predetermined range. In accordance with one aspect of these structure, the first power output apparatus further comprises: storage battery state measuring means for measuring a state of the storage battery. In this structure, the lock-up state control means comprises means for controlling the clutch motor via the clutch motor-driving circuit, in order to make the clutch motor in a lock-up state wherein the second rotor is not rotated relative to the first rotor, when the state of the storage battery measured by the storage battery state measuring means is within a predetermined range.

In accordance with another aspect of the present invention, the first power output apparatus comprises: an assist motor connected with the output shaft of the engine; an assist motor-driving circuit for driving and controlling the assist motor; a storage battery being charged with electric power regenerated by the assist motor via the assist motor-driving circuit and discharging electric power required to drive the assist motor via the assist motor-driving circuit; target torque setting means for setting a target torque, which is applied to the drive shaft, based on an instruction of a driver; drive shaft revolving speed measuring means for measuring a revolving speed of the drive shaft; engine driving torque setting means for setting a driving torque of the engine based on the revolving speed of the drive shaft measured by the drive shaft revolving speed measuring means and the target torque set by the target torque setting means; engine drive control means for controlling the engine so as to allow the engine to be driven with the driving torque set by the engine driving torque setting means; and additional torque control means for controlling the assist motor via the assist motor-driving circuit by utilizing charge and discharge electric power of the storage battery, in order to enable a torque expressed as a difference between the target torque set by the target torque setting means and the driving torque set by the engine driving torque setting means to be applied to the output shaft of the engine by the assist motor. The first power output apparatus of this preferred structure enables the assist motor to apply the torque, which corresponds to the difference between the target torque and the driving torque set by the engine driving torque setting means, to the output shaft. The torque acting on the drive shaft thus becomes substantially equal to the target torque. As long as the revolving speed of the engine coincides with the revolving speed of the drive shaft, it is not necessary to make the torque output from the engine coincide with the torque required for the drive shaft. In accordance with one aspect of this structure, the first power output apparatus further comprises: determination means for determining whether the revolving speed of the drive shaft measured by the drive shaft revolving speed measuring means is within a predetermined range. In this structure, the lock-up state control means comprises means for controlling the clutch motor via the clutch motor-driving circuit, in order to make the clutch motor in a lock-up state wherein the second rotor is not rotated relative to the first rotor, when it is determined by the determination means that the revolving speed of the drive shaft is within a predetermined range.

In accordance with another aspect of the first power output apparatus, the lock-up state control means comprises means for controlling the clutch motor via the clutch motor driving circuit, in order to make a relative position of the second rotor to the first rotor approach a predetermined position. In this structure, the lock-up state control means may comprise: position measuring means for measuring the relative position of the second rotor to the first rotor; and position control means for controlling the clutch motor via the clutch motor driving circuit, in order to make the relative position measured by the position measuring means approach the predetermined position.

In accordance with another aspect of the first power output apparatus, the lock-up state control means comprises means for controlling the clutch motor via the clutch motor driving circuit, in order to make the magnetism of magnetic poles produced on the first rotor and the second rotor of the clutch motor constant. In this structure, the lock-up state control means may comprise means for controlling the magnitude of the magnetic poles produced on the first rotor and the second rotor of the clutch motor, based on the power output from the engine. Or the engine may output pulsating power and the lock-up state control means may comprise means for controlling the magnitude of the magnetic poles produced on the first rotor and the second rotor of the clutch motor, based on the pulsation of the output power from the engine. In this structure, the power output apparatus may comprises: timing measuring means for measuring a timing of the pulsation of the output power from the engine; and torque variation memory means for storing a variation in torque acting on the output shaft of the engine, the variation depending upon the pulsation of the output power from the engine. The lock-up state control means may comprise means for controlling the magnitude of the magnetic poles based on the timing measured by the timing measuring means and the variation in torque stored in the torque variation memory means.

The present invention is also directed to a second power output apparatus for outputting power to a drive shaft. The second power output apparatus comprises: an engine having an output shaft; a complex motor comprising a first rotor connected with the output shaft of the engine, a second rotor connected with the drive shaft being coaxial to and rotatable relative to the first rotor, and a stator for rotating the second rotor, the first rotor and the second rotor constituting a clutch motor whereby power is transmitted between the output shaft of the engine and the drive shaft via an electromagnetic connection of the first rotor and the second rotor, the second rotor and the stator constituting an assist motor for supplying additional power to the drive shaft via the second rotor; a clutch motor-driving circuit for driving and controlling the clutch motor in the complex motor; an assist motor-driving circuit for driving and controlling the assist motor in the complex motor; a storage battery being charged with electric power regenerated by the assist motor via the assist motor-driving circuit and discharging electric power required to drive the assist motor via the assist motor-driving circuit; target torque setting means for setting a target torque, which is applied to the drive shaft, based on an instruction of a driver; drive shaft revolving speed measuring means for measuring a revolving speed of the drive shaft; engine driving torque setting means for setting a driving torque of the engine based on the revolving speed of the drive shaft measured by the drive shaft revolving speed measuring means and the target torque set by the target torque setting means; engine drive control means for controlling the engine so as to allow the engine to be driven with the driving torque set by the engine driving torque setting means; lock-up state control means for controlling the clutch motor via the clutch motor-driving circuit, in order to make the clutch motor in a lock-up state wherein the second rotor is not rotated relative to the first rotor; and additional torque control means for controlling the assist motor via the assist motor-driving circuit by utilizing charge and discharge electric power of the storage battery, in order to enable a torque expressed as a difference between the target torque set by the target torque setting means and the driving torque set by the engine driving torque setting means to be applied by the assist motor to the drive shaft via the second rotor.

The second power output apparatus of the invention enables the assist motor of the complex motor to apply the torque, which corresponds to the difference between the target torque and the driving torque set by the engine driving torque setting means, to the drive shaft. The torque acting on the drive shaft thus becomes substantially equal to the target torque. As long as the revolving speed of the engine coincides with the revolving speed of the drive shaft, it is not necessary to make the torque output from the engine coincide with the torque required for the drive shaft. This structure allows the engine to be driven in a wider range of driving points. The second power output apparatus also makes the clutch motor fall in the lock-up state wherein the relative rotation of the second rotor to the first rotor is not allowed. This structure enables the power output from the engine to be directly transmitted to the drive shaft.

In accordance with another aspect of the present invention, a third power output apparatus for outputting power to a drive shaft. The third power apparatus comprises: an engine having an output shaft; a complex motor comprising a first rotor connected with the output shaft of the engine, a second rotor connected with the drive shaft being coaxial to and rotatable relative to the first rotor, and a stator for rotating the second rotor, the first rotor and the second rotor constituting a clutch motor whereby power is transmitted between the output shaft of the engine and the drive shaft via an electromagnetic connection of the first rotor and the second rotor, the first rotor and the stator constituting an assist motor for supplying additional power to the output shaft of the engine via the first rotor; a clutch motor-driving circuit for driving and controlling the clutch motor in the complex motor; an assist motor-driving circuit for driving and controlling the assist motor in the complex motor; a storage battery being charged with electric power regenerated by the assist motor via the assist motor-driving circuit and discharging electric power required to drive the assist motor via the assist motor-driving circuit; target torque setting means for setting a target torque, which is applied to the drive shaft, based on an instruction of a driver; drive shaft revolving speed measuring means for measuring a revolving speed of the drive shaft; engine driving torque setting means for setting a driving torque of the engine based on the revolving speed of the drive shaft measured by the drive shaft revolving speed measuring means and the target torque set by the target torque setting means; engine drive control means for controlling the engine so as to allow the engine to be driven with the driving torque set by the engine driving torque setting means; lock-up state control means for controlling the clutch motor via the clutch motor-driving circuit, in order to make the clutch motor in a lock-up state wherein the second rotor is not rotated relative to the first rotor; and additional torque control means for controlling the assist motor via the assist motor-driving circuit by utilizing charge and discharge electric power of the storage battery, in order to enable a torque expressed as a difference between the target torque set by the target torque setting means and the driving torque set by the engine driving torque setting means to be applied by the assist motor to the output shaft of the engine via the first rotor.

The third power output apparatus of the invention enables the assist motor of the complex motor to apply the torque, which corresponds to the difference between the target torque and the driving torque set by the engine driving torque setting means, to the output shaft. The torque acting on the drive shaft thus becomes substantially equal to the target torque. As long as the revolving speed of the engine coincides with the revolving speed of the drive shaft, it is not necessary to make the torque output from the engine coincide with the torque required for the drive shaft. The second power output apparatus also makes the clutch motor fall in the lock-up state wherein the relative rotation of the second rotor to the first rotor is not allowed. This structure enables the power output from the engine to be directly transmitted to the drive shaft.

The above objects are also realized at least partly by a first method of controlling a power output apparatus. The first method comprises the steps of: (a) providing an engine having an output shaft; and a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; (b) measuring a relative position of the second rotor to the first rotor; and (c) controlling the clutch motor in order to make the relative position measured in the step (b) approach a predetermined position, thereby making the clutch motor in a lock-up state wherein the second rotor is not rotated relative to the first rotor.

The present invention is also directed to a second method of controlling a power output apparatus. The second method comprises the steps of: (a) providing an engine having an output shaft; and a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; (b) controlling the clutch motor in order to make the magnetism of magnetic poles produced on the first rotor and the second rotor of the clutch motor constant, thereby making the clutch motor in a lock-up state wherein the second rotor is not rotated relative to the first rotor.

The present invention is further directed to a third method of controlling a power output apparatus. The third method comprises the steps of: (a) providing an engine having an output shaft; a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; an assist motor connecting with the drive shaft; and a storage battery being charged with electric power regenerated by the assist motor and discharging electric power required to drive the assist motor, (b) setting a target torque, which is applied to the drive shaft, based on an instruction of a driver; (c) measuring a revolving speed of the drive shaft; (d) setting a driving torque of the engine based on the revolving speed of the drive shaft and the target torque, (e) controlling the engine so as to allow the engine to be driven with the driving torque; (f) controlling the clutch motor in order to make the clutch motor in a lock-up state wherein the second rotor is not rotated relative to the first rotor; and (g) controlling the assist motor by utilizing charge and discharge electric power of the storage battery, in order to enable a torque expressed as a difference between the target torque and the driving torque to be applied by the assist motor to the drive shaft via the second rotor.

These and other objects, features, aspects, and advantages of the present invention will become more apparent from the following detailed description of the preferred embodiments with the accompanying drawings.

DETAILED DESCRIPTION OF PREFERRED EMBODIMENTS

Figure 1:
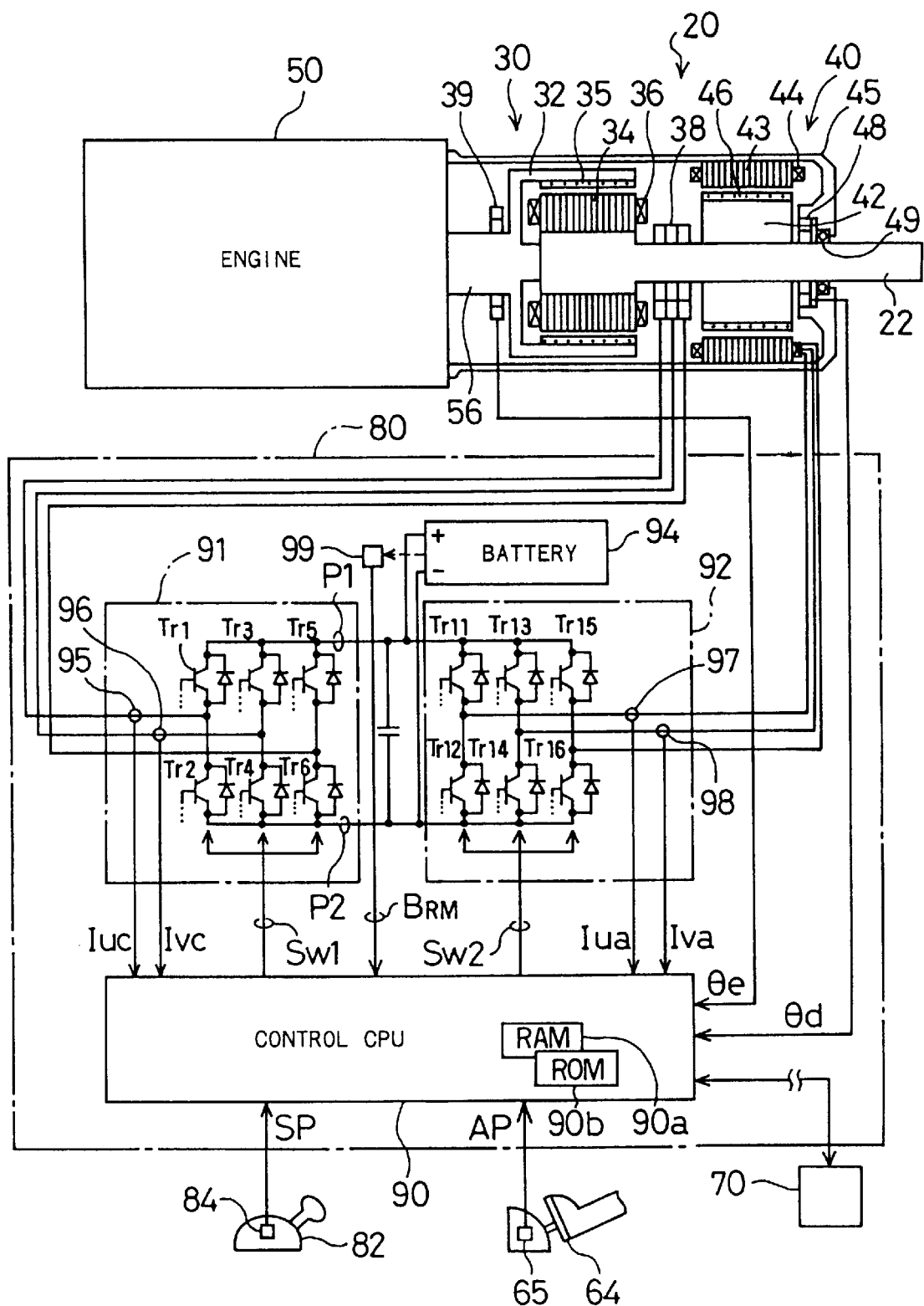
FIG. 1 schematically illustrates structure of a power output apparatus 20 as a first embodiment according to the present invention.
Figure 2:
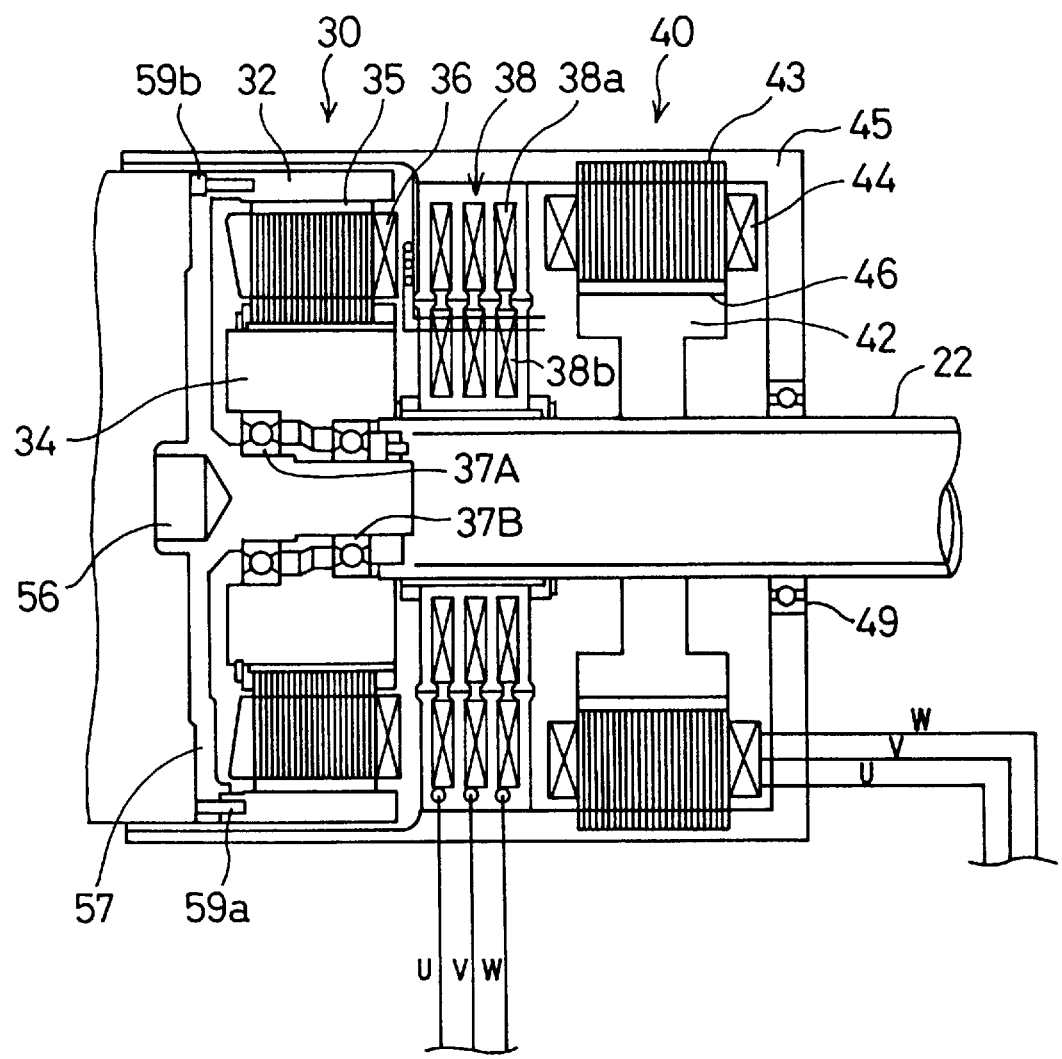
FIG. 2 is a cross sectional view illustrating detailed structures of a clutch motor 30 and an assist motor 40 included in the power output apparatus 20 of FIG. 1.
Figure 3:
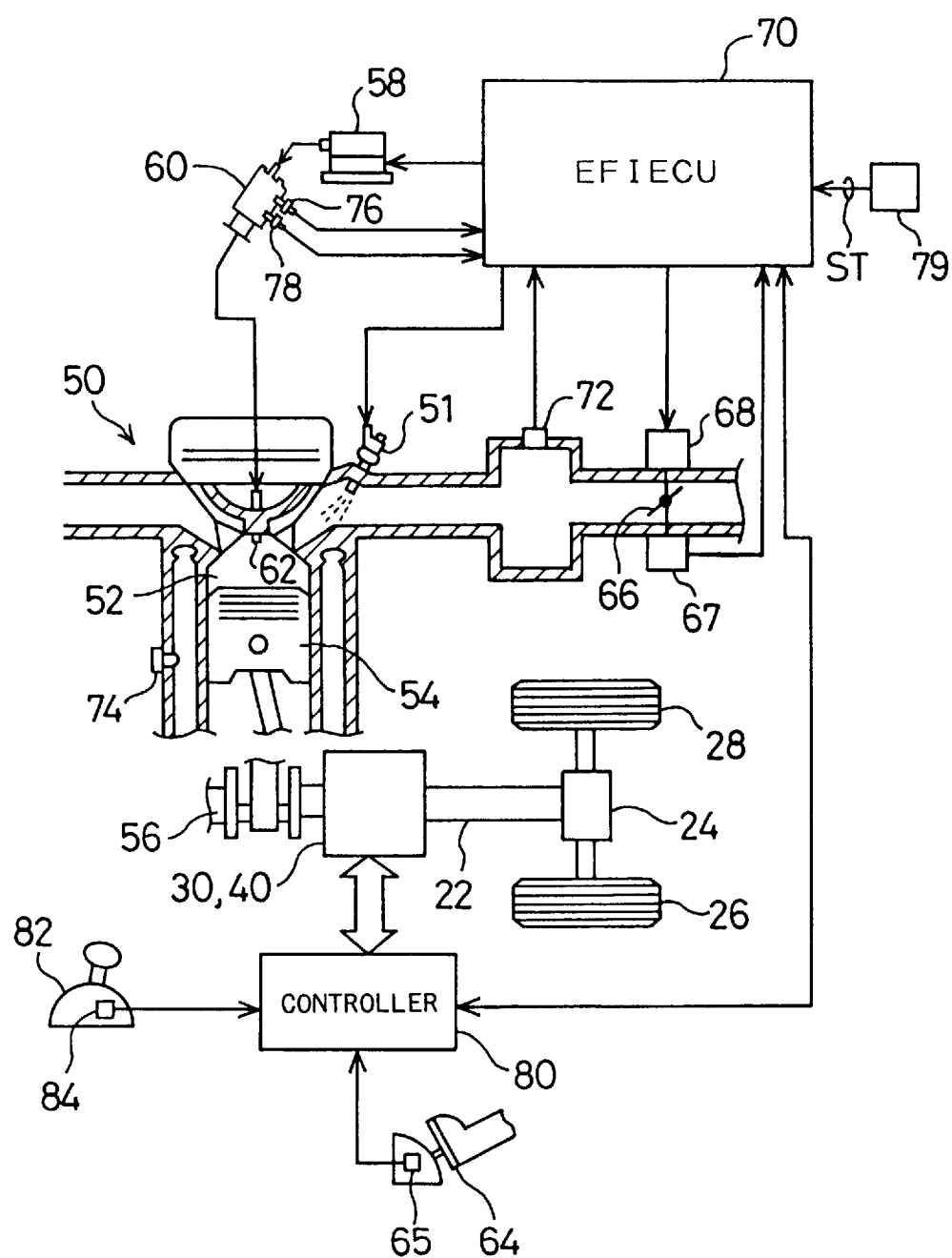
FIG. 3 is a schematic view illustrating general structure of a vehicle with the power output apparatus 20 of FIG. 1 incorporated therein.

FIG. 1 is a schematic view illustrating structure of a power output apparatus 20 as a first embodiment according to the present invention; FIG. 2 is a cross sectional view illustrating detailed structures of a clutch motor 30 and an assist motor 40 included in the power output apparatus 20 of FIG. 1; and FIG. 3 is a schematic view illustrating general structure of a vehicle with the power output apparatus 20 of FIG. 1 incorporated therein. The general structure of the vehicle is described first as a matter of convenience.

Referring to FIG. 3, the vehicle is provided with an engine 50 driven by gasoline as a power source. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark, which explosively ignites and combusts the air/fuel mixture.

Operation of the engine 50 is controlled by an electronic control unit (hereinafter referred to as EFIECU) 70. The EFIECU 70 receives information from various sensors, which detect operating conditions of the engine 50. These sensors include a throttle position sensor 67 for detecting the valve travel or the position of the throttle valve 66, a manifold vacuum sensor 72 for measuring a load applied to the engine 50, a water temperature sensor 74 for measuring the temperature of cooling water in the engine 50, and a speed sensor 76 and an angle sensor 78 mounted on the distributor 60 for measuring the revolving speed and rotational angle of the crankshaft 56. A starter switch 79 for detecting a starting condition ST of an ignition key (not shown) is also connected to the EFIECU 70. Other sensors and switches connecting with the EFIECU 70 are omitted from the drawings.

The crankshaft 56 of the engine 50 is linked with a drive shaft 22 via a clutch motor 30 and an assist motor 40 (described later in detail). The drive shaft 22 further connects with a differential gear 24, which eventually transmits the torque output from the drive shaft 22 of the power output apparatus 20 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82 and an accelerator position sensor 65 attached to an accelerator pedal 64, as described later in detail. The controller 80 sends and receives a variety of data and information to and from the EFIECU 70 through communication. Details of the control procedure including a communication protocol will be described later.

Referring to FIG. 1, the power output apparatus 20 essentially includes the engine 50, the clutch motor 30 with an outer rotor 32 and an inner rotor 34, the assist motor 40 with a rotor 42, and the controller 80 for driving and controlling the clutch motor 30 and the assist motor 40. The outer rotor 32 of the clutch motor 30 is mechanically connected to one end of the crankshaft 56 of the engine 50, whereas the inner rotor 34 thereof is mechanically linked with the rotor 42 of the assist motor 40.

As shown in FIG. 1, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a rotary transformer 38. A thin laminated sheet of non-directional electromagnetic steel is used to form teeth and slots for the three-phase coils 36 in the inner rotor 34. A resolver 39 for measuring a rotational angle θe of the crankshaft 56 is attached to the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a rotating magnetic field. The stator 43 is also made of a thin laminated sheet of non-directional electromagnetic steel. A plurality of permanent magnets 46 are attached to an outer surface of the rotor 42. In the assist motor 40, interaction between a magnetic field formed by the permanent magnets 46 and a rotating magnetic field formed by the three-phase coils 44 leads to rotation of the rotor 42. The rotor 42 is mechanically linked with the drive shaft 22 working as the torque output shaft of the power output apparatus 20. A resolver 48 for measuring a rotational angle θd of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. The rotational and axial torque of the crankshaft 56 of the engine 50 is transmitted via the outer rotor 32 and the inner rotor 34 of the clutch motor 30 to the drive shaft 22, whereas the torque by the assist motor 40 is added to or subtracted from the transmitted torque.

While the assist motor 40 is constructed as a conventional permanent magnet-type three-phase synchronous motor, the clutch motor 30 includes two rotating elements or rotors, that is, the outer rotor 32 with the permanent magnets 35 and the inner rotor 34 with the three-phase coils 36. The detailed structure of the clutch motor 30 is described with the cross sectional view of FIG. 2. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like element, to which the inner rotor 34 is rotatably attached by means of bearings 37A and 37B. One end of the drive shaft 22 is fixed to the inner rotor 34.

A plurality of permanent magnets 35, four in this embodiment, are attached to the inner surface of the outer rotor 32 as mentioned previously. The permanent magnets 35 are magnetized in the direction towards the axial center of the clutch motor 30, and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38a fixed to the casing 45 and secondary windings 38b attached to the drive shaft 22 coupled with the inner rotor 34. Electromagnetic induction allows electric power to be transmitted from the primary windings 38a to the secondary windings 38b or vice versa. The rotary transformer 38 has windings for three phases, that is, U, V, and W phases, to enable the transmission of three-phase electric currents.

Interaction between a magnetic field formed by one adjacent pair of permanent magnets 35 and a rotating magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 and the assist motor 40 will be described later based on the flowcharts.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data through the input/output port. The input data include a rotational angle θe of the crankshaft 56 of the engine 50 from the resolver 39, a rotational angle θd of the drive shaft 22 from the resolver 48, an accelerator pedal position AP (step-on amount of the accelerator pedal 64) from the accelerator position sensor 65, a gearshift position SP from the gearshift position sensor 84, clutch motor currents Iuc and Ivc from two ammeters 95 and 96 in the first driving circuit 91, assist motor currents Iua and Iva from two ammeters 97 and 98 in the second driving circuit 92, and a residual capacity BRM of the battery 94 from a residual capacity meter 99. The residual capacity meter 99 may determine the residual capacity BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines P1 and P2. The three-phase coils (U,V,W) 36 of the clutch motor 30 are connected via the rotary transformer 38 to the respective contacts of the paired transistors. The power lines P1 and P2 are respectively connected to plus and minus terminals of the battery 94. The first control signal SW1 output from the control CPU 90 successively controls the power-on time of the paired transistors Tr1 through Tr6. The electric current flowing through each coil 36 undergoes PWM (pulse width modulation) to give a quasi-sine wave, which enables the three-phase coils 36 to form a rotating magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 successively controls the power-on time of the paired transistors Tr11 through Tr16. The electric current flowing through each coil 44 undergoes PWM to give a quasi-sine wave, which enables the three-phase coils 44 to form a rotating magnetic field.

The power output apparatus 20 thus constructed works in accordance with the operation principles described below, especially with the principle of torque conversion. By way of example, it is assumed that the engine 50 driven by the EFIECU 70 rotates at a revolving speed Ne equal to a predetermined value N1. While the transistors Tr1 through Tr6 in the first driving circuit 91 are in OFF position, the controller 80 does not supply any current to the three-phase coils 36 of the clutch motor 30 via the rotary transformer 38. No supply of electric current causes the outer rotor 32 of the clutch motor 30 to be electromagnetically disconnected from the inner rotor 34. This results in racing the crankshaft 56 of the engine 50. Under the condition that all the transistors Tr1 through Tr6 are in OFF position, there is no regeneration of energy from the three-phase coils 36, and the engine 50 is kept at an idle.

As the control CPU 90 of the controller 80 outputs the first control signal SW1 to control on and off the transistors Tr1 through Tr6 in the first driving circuit 91, a constant electric current is flown through the three-phase coils 36 of the clutch motor 30, based on the difference between the revolving speed Ne of the crankshaft 56 of the engine 50 and a revolving speed Nd of the drive shaft 22 (that is, difference Nc (=Ne−Nd) between the revolving speed of the outer rotor 32 and that of the inner rotor 34 in the clutch motor 30). A certain slip accordingly exists between the outer rotor 32 and the inner rotor 34 connected with each other in the clutch motor 30. At this moment, the inner rotor 34 rotates at the revolving speed Nd, which is lower than the revolving speed Ne of the crankshaft 56 of the engine 50. In this state, the clutch motor 30 functions as a generator and carries out the regenerative operation to regenerate an electric current via the first driving circuit 91. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 4:
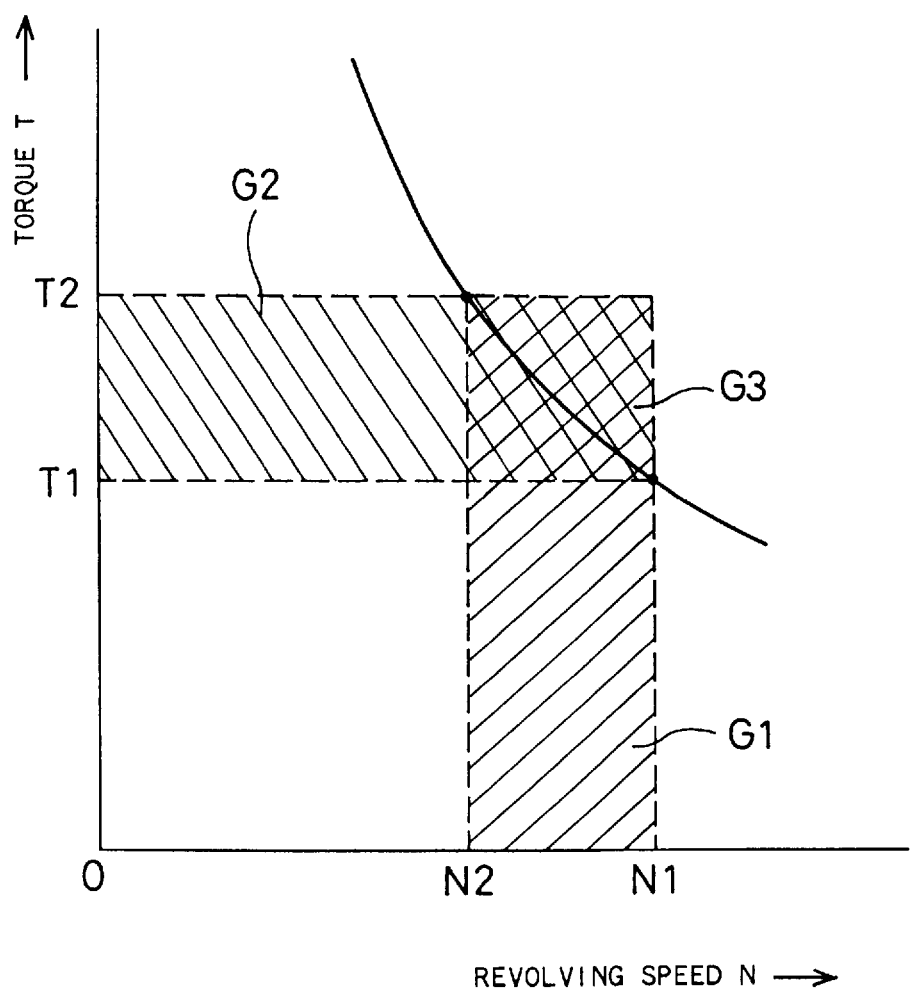
FIG. 4 is a graph showing the operation principle of the power output apparatus 20.

Referring to FIG. 4, while the crankshaft 56 of the engine 50 is driven at a revolving speed N1 and a torque T1, energy in a region G1 is regenerated as electric power by the clutch motor 30. The regenerated power is supplied to the assist motor 40 and converted to energy in a region G2, which enables the drive shaft 22 to rotate at a revolving speed N2 and a torque T2. The torque conversion is carried out in the manner discussed above, and the energy corresponding to the slip in the clutch motor 30 or the revolving speed difference Nc (=Ne−Nd) is consequently given as a torque to the drive shaft 22.

In another example, it is assumed that the engine 50 is driven at a revolving speed Ne=N2 and a torque Te=T2, whereas the drive shaft 22 is rotated at the revolving speed N1, which is greater than the revolving speed N2. In this state, the inner rotor 34 of the clutch motor 30 rotates relative to the outer rotor 32 in the direction of rotation of the drive shaft 22 at a revolving speed defined by the absolute value of the revolving speed difference Nc (=Ne−Nd). While functioning as a normal motor, the clutch motor 30 consumes electric power to apply the energy of rotational motion to the drive shaft 22. When the control CPU 90 of the controller 80 controls the second driving circuit 92 to enable the assist motor 40 to regenerate electrical energy, a slip between the rotor 42 and the stator 43 of the assist motor 40 makes the regenerative current flow through the three-phase coils 44. In order to allow the clutch motor 30 to consume the energy regenerated by the assist motor 40, the control CPU 90 controls both the first driving circuit 91 and the second driving circuit 92. This enables the clutch motor 30 to be driven without using any electric power stored in the battery 94.

Referring back to FIG. 4, when the crankshaft 56 of the engine 50 is driven at the revolving speed N2 and the torque T2, energy in the sum of regions G2 and G3 is regenerated as electric power by the assist motor 40 and supplied to the clutch motor 30. Supply of the regenerated power enables the drive shaft 22 to rotate at the revolving speed N1 and the torque T1.

Other than the torque conversion and revolving speed conversion discussed above, the power output apparatus 20 of the embodiment can charge the battery 94 with an excess of electrical energy or discharge the battery 94 to supplement the electrical energy. This is implemented by controlling the mechanical energy output from the engine 50 (that is, the product of the torque Te and the revolving speed Ne), the electrical energy regenerated or consumed by the clutch motor 30, and the electrical energy regenerated or consumed by the assist motor 40. The output energy from the engine 50 can thus be transmitted as power to the drive shaft 22 at a higher efficiency.

The power output apparatus 20 of the embodiment carries out lock-up control other than the torque conversion control discussed above or modified torque conversion control including a process of charging and discharging the battery 94. The lock-up control is implemented according to a first lock-up control routine illustrated in the flowchart of FIG. 5, which electromagnetically locks up the outer rotor 32 and the inner rotor 34 of the clutch motor 30 and thereby directly transmits the power generated by the engine 50 to the drive shaft 22.

When the program enters the first lock-up control routine, the control CPU 90 of the controller 80 first receives data of revolving speed Nd of the drive shaft 22 at step S100. The revolving speed Nd of the drive shaft 22 may be computed from the rotational angle θd of the drive shaft 22 read from the resolver 48. At subsequent step S102, the control CPU 90 reads the accelerator pedal position AP measured by the accelerator position sensor 65. The driver steps on the accelerator pedal 64 when feeling insufficiency of output torque. The value of the accelerator pedal position AP accordingly represents the desired output torque (that is, desired torque of the drive shaft 22) which the driver requires. The program then goes to step S104 at which the control CPU 90 computes a target output torque Td* (of the drive shaft 22) corresponding to the input accelerator pedal position AP. The target output torque Td* is hereinafter referred to as the output torque command value. Output torque command values Td* have been set in advance for the respective accelerator pedal positions AP. In response to an input of the accelerator pedal position AP, the output torque command value Td* corresponding to the input accelerator pedal position AP is selected among the output torque command values Td* previously registered.

Figure 6:
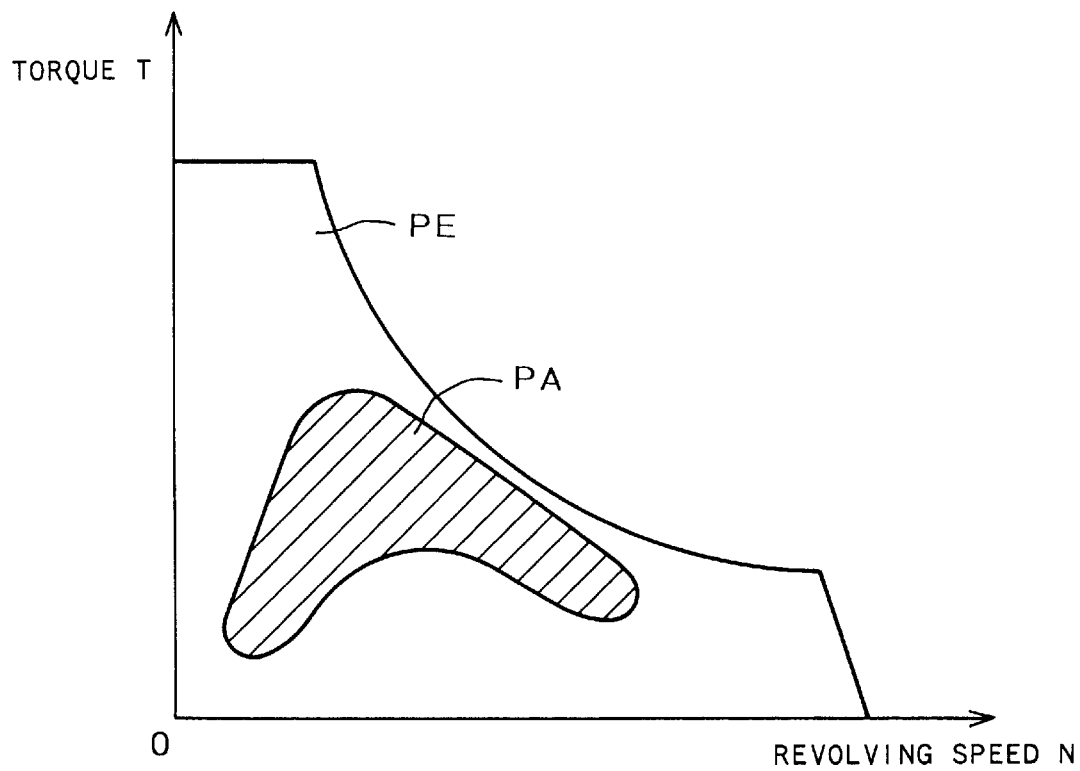
FIG. 6 is a map illustrating an appropriate range of lock-up control of the engine 50 by way of example.

After computing the output torque command value Td*, the control CPU 90 determines whether a driving point of the engine 50 specified by the output torque command value Td* and the revolving speed Nd is within an appropriate range of lock-up control at step S106. In accordance with a concrete procedure, a map prepared in advance and stored in the ROM 90b defines a specific set of driving points of the engine 50 as an appropriate range of lock-up control. Based on this map, it is determined whether the driving point specified by the output torque command value Td* and the revolving speed Nd is within the appropriate range. The map of FIG. 6 illustrates an appropriate range of lock-up control of the engine 50 by way of example. In the graph of FIG. 6, the engine 50 can be operated in a range PE, whereas a range PA filled with slant lines represents the appropriate range of lock-up control. The appropriate range PA of lock-up control is determined depending upon the efficiency and emission of the engine 50 and may be set based on the experimental data.

When it is determined that the specified driving point is within the appropriate range of lock-up control at step S106, the target engine speed Ne* and the target engine torque Te* of the engine 50 are respectively set equal to the revolving speed Nd and the output torque command value Td* at step S108. A maximum torque Tmax is then computed at step S110 by taking into account the pulsation of torque (torque ripple) output from the engine 50 to the crankshaft 56, when the engine 50 is driven at the driving point of the target engine torque Te* and the target engine speed Ne*. In this embodiment, the engine 50 is an internal combustion engine using gasoline as power. Even when the engine 50 is driven in a stationary state at the driving point of the target engine torque Te* and the target engine speed Ne*, the torque output from the engine 50 to the crankshaft 56 is not a constant value of Te* but is periodically varied with the average torque of Te*. The maximum torque Tmax of the engine 50 accordingly represents the maximum torque ripple. In this embodiment, experimental data of maximum torque ripple at a variety of driving points of the engine 50 are obtained in advance and stored in the ROM 90b as a map representing the relationship between the target engine torque Te*, the target engine speed Ne*, and the maximum torque Tmax. The maximum torque Tmax corresponding to the target engine torque Te* and the target engine speed Ne* set at step S108 is read from the map stored in the ROM 90b.

Figure 7:
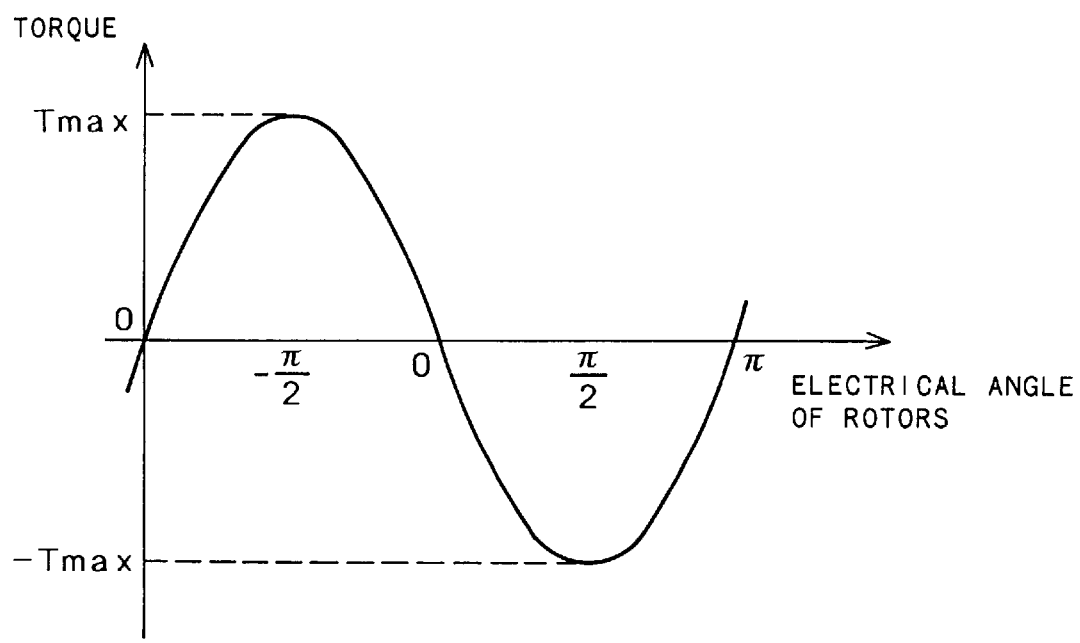
FIG. 7 is a graph showing the torque plotted against the electrical angle of rotors when a constant current is flown through the three-phase coils 36.

The control CPU 90 determines a constant current Ic made to flow through the three-phase coils 36, which is required to lock up the clutch motor 30, at step S112. When a constant current flows through the three-phase coils 36 of the clutch motor 30, the torque Tc of the clutch motor 30 is varied with respect to the electrical angle of the outer rotor 32 and the inner rotor 34 as shown in the graph of FIG. 7, in which the torque is plotted against the electrical angle of rotors. The torque Tc of the clutch motor 30 reaches its maximum when the electrical angle of rotors is advanced or delayed by π/2. The clutch motor 30 falls in a lock-up state when a constant current is made to flow through the three-phase coils 36 in order to make the torque Tc equal to or greater than the maximum torque Tmax computed at step S110. In this embodiment, a value of constant current Ic is determined experimentally corresponding to each maximum torque Tmax, so that the torque Tc of the clutch motor 30 at the point where the electrical angle of rotors is π/2 is set to be a little greater than the maximum torque Tmax. The experimental data are stored in the ROM 90b as a map representing the relationship between the maximum torque Tmax and the value of constant current Ic. The value of constant current Ic corresponding to the maximum torque Tmax obtained at step S110 is read from the map stored in the ROM 90b.

At subsequent step S114, the control CPU 90 determines a torque command value Ta* of the assist motor 40 based on the maximum torque Tmax. The torque command value Ta* of the assist motor 40 is set to a specific level which allows electric power consumed by the clutch motor 30 (that is, by making the constant current Ic flow through the three-phase coils 36 of the clutch motor 30) to be just regenerated by the assist motor 40. In this embodiment, the torque command value Ta* of the assist motor 40 is determined experimentally corresponding to each maximum torque Tmax. The experimental data are stored in the ROM 90b as a map representing the relationship between the maximum torque Tmax and the torque command value Ta*. The torque command value Ta* of the assist motor 40 corresponding to the maximum torque Tmax obtained at step S110 is read from the map stored in the ROM 90b. The electric power consumed by the clutch motor 30 is only that required to lock up the clutch motor 30. This is significantly smaller than the output power of the engine 50 converted to electric power. The assist motor 40 is thus required to regenerate only a small amount of electric power, and the torque command value Ta* of the assist motor 40 is set to a relatively low level.

After determining the target engine torque Te* and the target engine speed Ne* of the engine 50, the value of constant current Ic made to flow through the three-phase coils 36 of the clutch motor 30, and the torque command value Ta* of the assist motor 40, the program proceeds to steps S116, S118, and S120 to control the clutch motor 30, the assist motor 40, and the engine 50 based on these values. As a matter of convenience of illustration, the control procedures of the clutch motor 30, the assist motor 40, and the engine 50 are shown as separate steps. Under the practical condition, however, these control procedures are carried out concurrently. For example, the control CPU 90 simultaneously controls the clutch motor 30 and the assist motor 40 by interrupt processing, while transmitting an instruction to the EFIECU 70 through communication to control the engine 50 concurrently.

The control of the clutch motor 30 (step S116), as discussed above, is implemented by controlling the first driving circuit 91 to enable the preset constant current Ic to flow through the three-phase coils 36.

Figure 5:
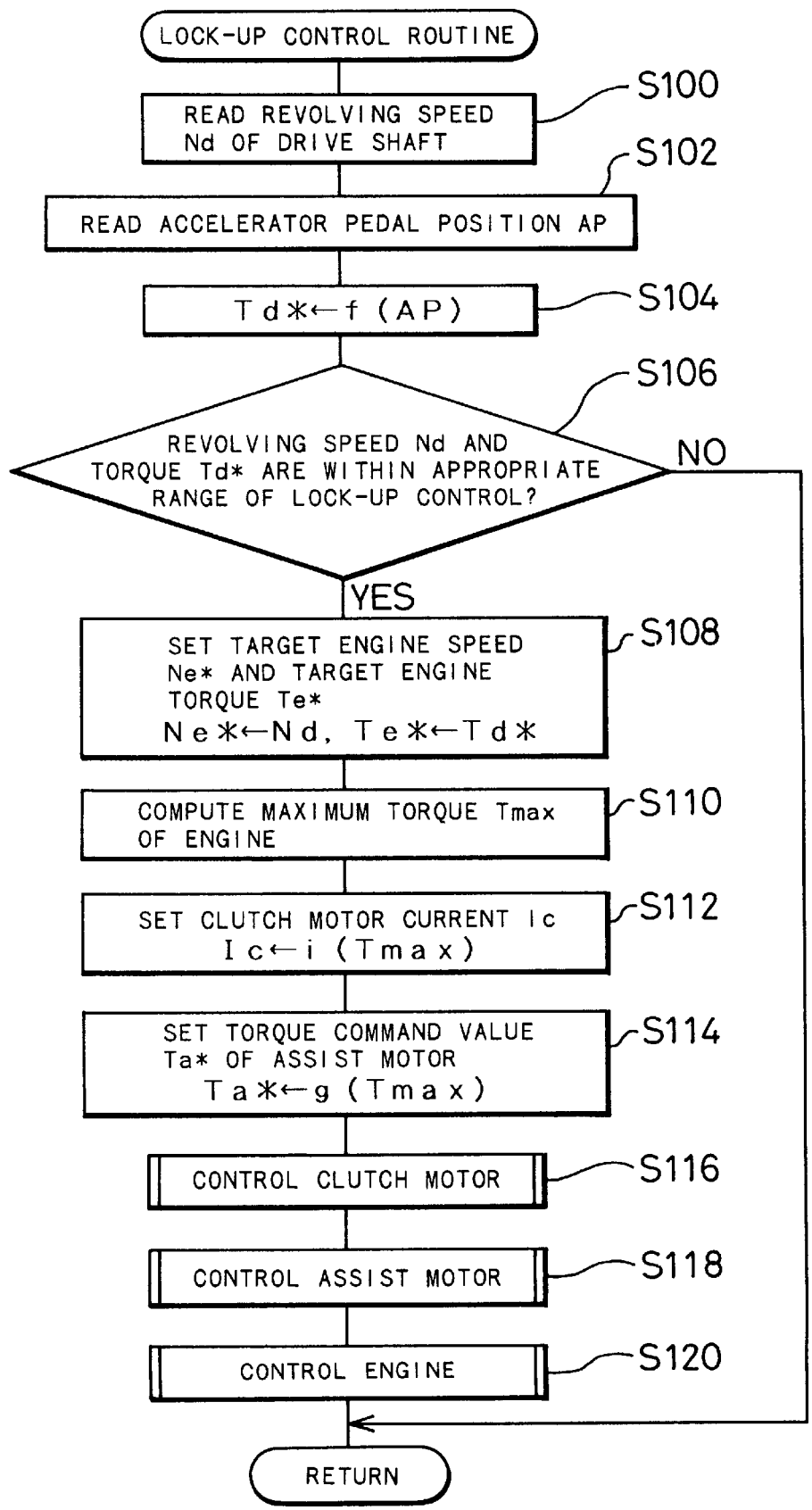
FIG. 5 is a flowchart showing a first lock-up control routine executed by the control CPU 90 of the controller 80 in the first embodiment.
Figure 8:
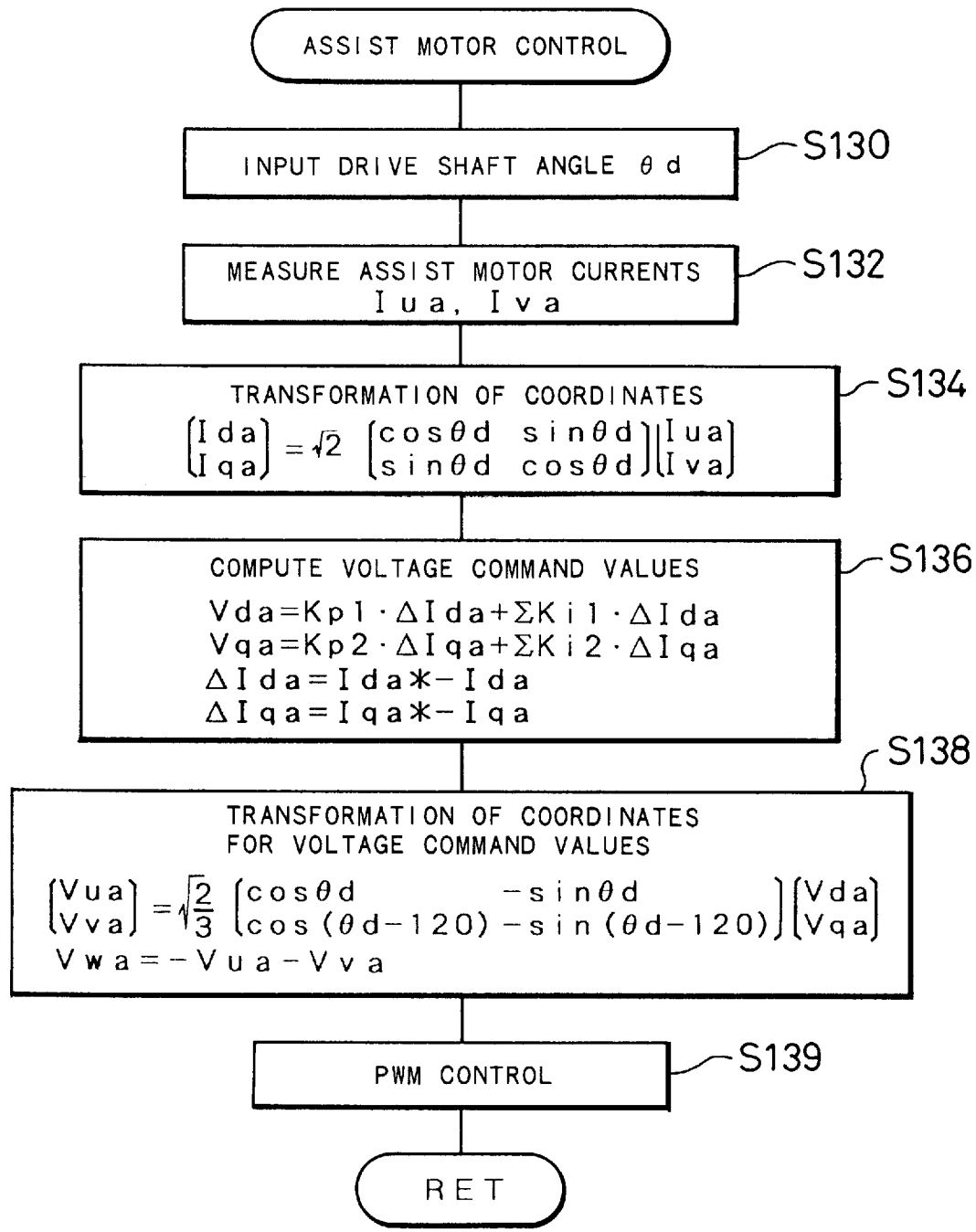
FIG. 8 is a flowchart showing details of the control process of the assist motor 40 executed at step S118 in the first lock-up control routine of FIG. 5.

FIG. 8 is a flowchart showing details of the control process of the assist motor 40 executed at step S118 in the flowchart of FIG. 5. When the program enters the assist motor control routine, the control CPU 90 of the controller 80 first reads the rotational angle θd of the drive shaft 22 from the resolver 48 at step S130. The control CPU 90 then receives data of assist motor currents Iua and Iva, which respectively flow through the U phase and V phase of the three-phase coils 44 in the assist motor 40, from the ammeters 97 and 98 at step S132. Although the currents naturally flow through all the three phases U, V, and W. measurement is required only for the currents passing through the two phases since the sum of the currents is equal to zero. At subsequent step S134, the control CPU 90 executes transformation of coordinates (three-phase to two-phase transformation) with respect to the data of assist motor currents flowing through the three phases. The transformation of coordinates maps the values of currents flowing through the three phases to the values of currents passing through d and q axes of the permanent magnet-type synchronous motor and is executed according to Equation (1) given below:

$$\begin{bmatrix} Ida \\ Iqa \end{bmatrix} = \sqrt{2} \begin{bmatrix} -\sin(\theta d - 120) & \sin\theta d \\ -\cos(\theta d - 120) & \cos\theta d \end{bmatrix} \begin{bmatrix} Iua \\ Iva \end{bmatrix} \quad (1)$$

The transformation of coordinates is carried out because the currents flowing through the d and q axes are essential for the torque control in the permanent magnet-type synchronous motor. Alternatively, the torque control may be executed directly using the currents flowing through the three phases.

After the transformation to the currents of two axes, the control CPU 90 computes deviations of currents Ida and Iqa actually flowing through the d and q axes from current command values Ida* and Iqa* of the respective axes, which are calculated from the torque command value Ta* of the assist motor 40, and determines voltage command values Vda and vqa for the d and q axes at step S136. In accordance with a concrete procedure, the control CPU 90 executes operations specified by Equations (2) and Equations (3) given below:

$$\Delta Ida = Ida^* - Ida$$
$$\Delta Iqa = Iqa^* - Iqa \quad (2)$$
$$Vda = Kp1 \cdot \Delta Ida + \Sigma Ki1 \cdot \Delta Ida$$
$$Vqa = Kp2 \cdot \Delta Iqa + \Sigma Ki2 \cdot \Delta Iqa \quad (3)$$

wherein Kp1, Kp2, Ki1, and Ki2 represent coefficients, which are adjusted to be suited to the characteristics of the motor applied. The voltage command value Vda (vqa) includes a part in proportion to the deviation ΔI from the current command value I* (first term in right side of Equation (3)) and a summation of historical data of the deviations ΔI for 'i' times (second term in right side).

The control CPU 90 then re-transforms the coordinates of the voltage command values thus obtained (two-phase to three-phase transformation) at step S138. This corresponds to an inverse of the transformation executed at step S134. The inverse transformation determines voltages Vua, Vva, and Vwa actually applied to the three-phase coils 44 as given below:

$$\begin{bmatrix} Vua \\ Vva \end{bmatrix} = \sqrt{\frac{2}{3}} \begin{bmatrix} \cos\theta d & -\sin\theta d \\ \cos(\theta d - 120) & -\sin(\theta d - 120) \end{bmatrix} \begin{bmatrix} Vda \\ Vqa \end{bmatrix} \quad (4)$$
$$Vwa = -Vua - Vva$$

The actual voltage control is accomplished by on-off operation of the transistors Tr11 through Tr16 in the second driving circuit 92. At step S139, the on- and off-time of the transistors Tr11 through Tr16 in the second driving circuit 92 is PWM (pulse width modulation) controlled in order to attain the voltage command values Vua, Vva, and Vwa determined by Equation (4) above.

The assist motor 40 is subject to the power operation for the positive torque command value Ta* and the regenerative operation for the negative torque command value Ta*. The torque command value Ta* determined at step S114 in the first lock-up control routine of FIG. 5 is negative since it is set with a view to enabling the assist motor 40 to regenerate electric power. The assist motor 40 is accordingly controlled to carry out the regenerative operation. The torque command value Ta* of the assist motor 40 is positive when a positive torque is applied to the drive shaft 22 in the direction of rotation of the crankshaft 56.

The control of the engine 50 (step S120 in the first lock-up control routine of FIG. 5) is executed in the following manner. In order to attain stationary driving at the target engine torque Te* and the target engine speed Ne* (set at step S108 in FIG. 5), the control CPU 90 regulates the torque Te and the revolving speed Ne of the engine 50 to make them approach the target engine torque Te* and the target engine speed Ne*, respectively. In accordance with a concrete procedure, the control CPU 90 sends an instruction to the EFIECU 70 through communication to regulate the amount of fuel injection or the throttle valve position. Such regulation makes the torque Te and the revolving speed Ne of the engine 50 eventually approach the target engine torque Te* and the target engine speed Ne*.

When it is determined that a driving point of the engine 50 specified by the output torque command value Td* and the revolving speed Nd is out of the appropriate range of lock-up control at step S106 in the flowchart of FIG. 5, the program determines no requirement for the lock-up control and immediately exits from the first lock-up control routine. In such a case, the control CPU 90 of the controller 80 executes another control operation, for example, the process of torque conversion discussed above based on a torque control routine (not shown).

In the power output apparatus 20 of the embodiment, the clutch motor 30 is set in a lock-up state, and the power output from the engine 50 is thus directly transmitted to the drive shaft 22. The electric power required to lock up the clutch motor 30 is regenerated by the assist motor 40. This structure does not require the electric power stored in the battery 94 for the lock-up control.

Although the assist motor 40 regenerates electric power required to lock up the clutch motor 30 in the power output apparatus 20 of the embodiment, the required electric power may be supplied from the battery 94. This alternative structure does not require the processing at step S114 in the first lock-up control routine of FIG. 5.

In the power output apparatus 20 of the embodiment, the lock-up control is carried out only when the driving point of the engine 50 specified by the output torque command value Td* and the revolving speed Nd is within the appropriate range of lock-up control. In accordance with another preferred structure, the lock-up control may be carried out when only the revolving speed Nd is within an appropriate range of lock-up control, irrespective of the output torque command value Td*. In this modified structure, the controller 80 follows a second lock-up control routine shown in the flowchart of FIG. 9, instead of the first lock-up control routine of FIG. 5. The second lock-up control routine of FIG. 9 uses only the revolving speed Nd as the basis of decision.

When the program enters the second lock-up control routine, the control CPU 90 of the controller 80 first receives data of revolving speed Nd of the drive shaft 22 at step S140 and data of accelerator pedal position AP at step S142, and computes the output torque command value Td* corresponding to the input accelerator pedal position AP at step S144. The processing of steps S140 through S144 is identical with that of steps S100 through S104 in the first lock-up control routine of FIG. 5.

It is determined at step S146 whether the revolving speed Nd is within an appropriate range of lock-up control of the engine 50. The map shown in FIG. 6 is, for example, used for the determination at step S146, like in the first lock-up control routine of FIG. 5. When the revolving speed Nd is determined to be out of the appropriate range of lock-up control, the program determines no requirement for the lock-up control and immediately exits from the routine.

When the revolving speed Nd is determined to be within the appropriate range of lock-up control at step S146, on the contrary, the program proceeds to step S148 at which the target engine speed Ne* of the engine 50 is set equal to the revolving speed Nd. The control CPU 90 then reads a minimum torque T1 and a maximum Torque T2 in the appropriate range of lock-up control at the input revolving speed Nd from the map discussed above (for example, the map of FIG. 6) at step S150. The output torque command value Td* is compared with the input minimum torque T1 and maximum torque T2 at step S152.

When the output torque command value Td* is not less than the minimum torque T1 but not greater than the maximum torque T2 at step S152, the program goes to step S154 at which the target engine torque Te* of the engine 50 is set equal to the output torque command value Td*. When the output torque command value Td* is less than the minimum torque T1, the program goes to step S156 at which the target engine torque Te* is set equal to the minimum torque T1. When the output torque command value Td* is greater than the maximum torque T2, the program goes to step S158 at which the target engine torque Te* is set equal to the maximum torque T2. This process makes the driving point of the engine 50 specified by the target engine torque Te* and the target engine speed Ne* within the appropriate range of lock-up control.

The control CPU 90 computes a maximum torque Tmax of the engine 50 at the driving point of the engine 50 specified by the target engine torque Te* and the target engine speed Ne* at step S160. At subsequent step S162, the control CPU 90 sets a value of constant current Ic, which is made to flow through the three-phase coils 36 of the clutch motor 30, based on the maximum torque Tmax thus obtained. The computation of the maximum torque Tmax at step S160 and the determination of the constant current Ic at step S162 are respectively identical with the processing of step S110 and that of step S112 in the first lock-up control routine of FIG. 5. The torque command value Ta* of the assist motor 40 is calculated by subtracting the target engine torque Te* from the output torque command value Td* at step S164.

After determining the target engine torque Te* and the target engine speed Ne* of the engine 50, the value of constant current Ic made to flow through the three-phase coils 36 of the clutch motor 30, and the torque command value Ta* of the assist motor 40, the program proceeds to steps S166, S168, and S170 to control the clutch motor 30, the assist motor 40, and the engine 50 based on these values. The control procedures of steps S166 through S170 are identical with those of steps S116 through S120 in the first lock-up control routine of FIG. 5.

Figure 9:
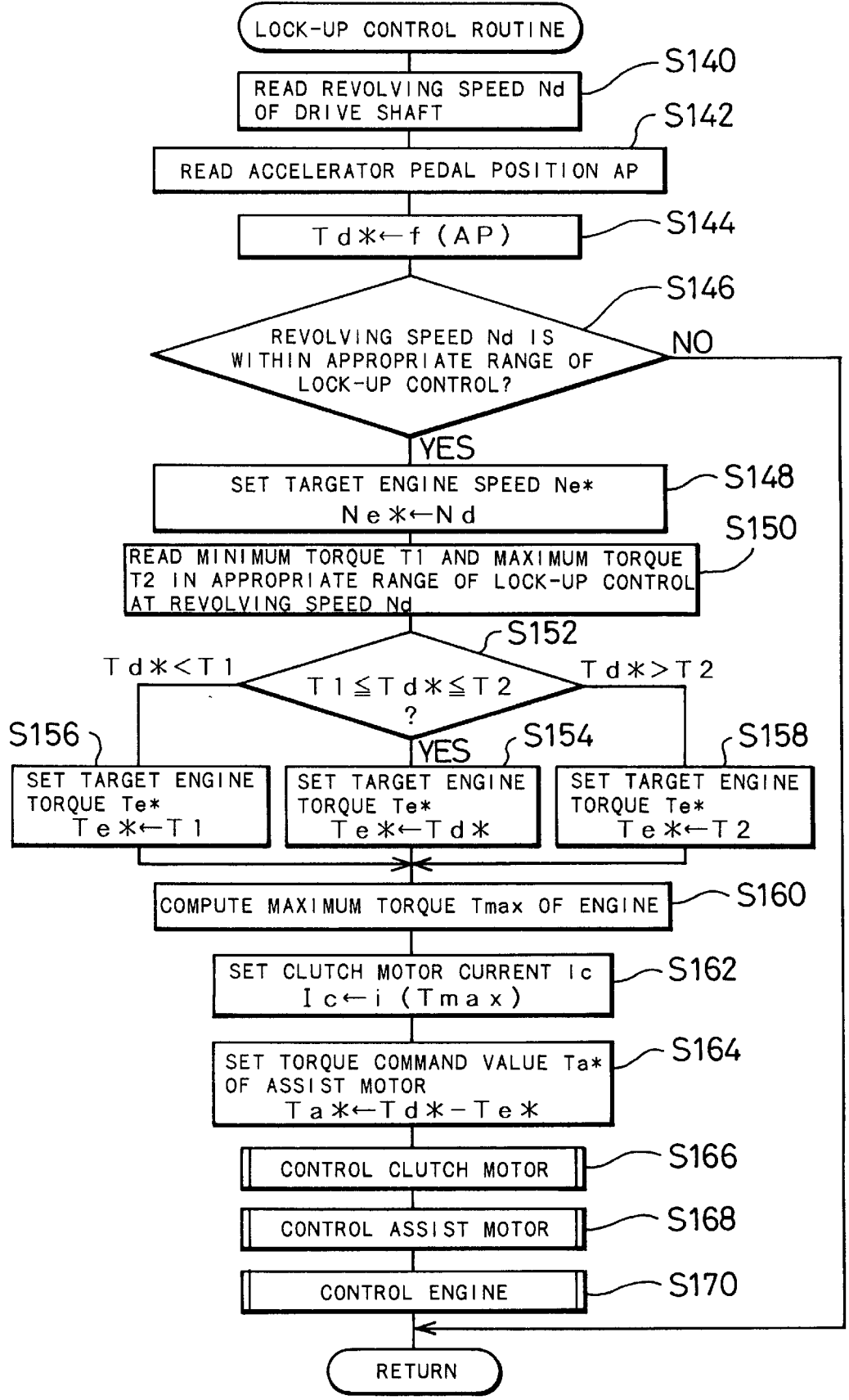
FIG. 9 is a flowchart illustrating a second lock-up control routine executed by the controller 80 in the first embodiment.
Figure 10:
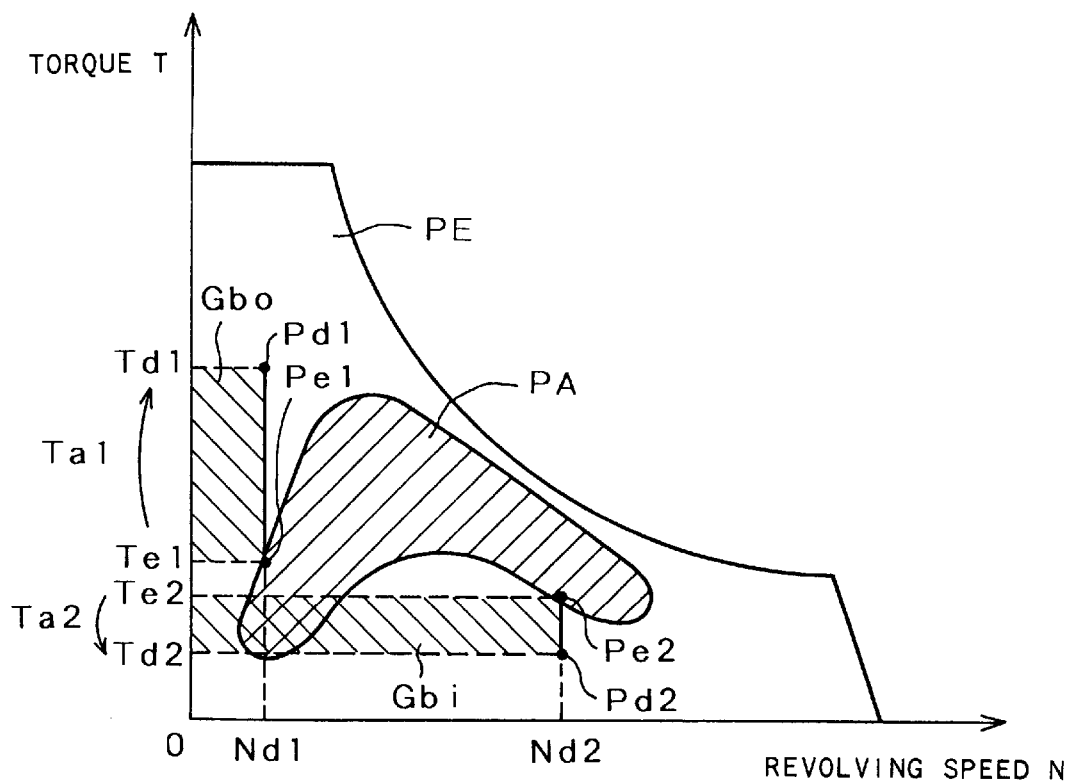
FIG. 10 is a graph showing the torque applied to the drive shaft 22 when the second lock-up control routine of FIG. 9 is carried out.

FIG. 10 is a graph showing the torque applied to the drive shaft 22 when the second lock-up control routine of FIG. 9 is carried out. By way of example, it is assumed that the drive shaft 22 is rotated at a predetermined revolving speed Nd1 and the output torque command value Td* depending upon the step-on amount of the accelerator pedal 64 is equal to a value Td1; that is, it is required that the drive shaft 22 is driven at a driving point Pd1. Whereas the revolving speed Nd1 is within an appropriate range PA of lock-up control, the output torque command value Td*=Td1 is far beyond the upper limit of the appropriate range PA. Under such conditions, the target engine torque Te* of the engine 50 is set equal to the upper limit torque T2 (=Te1) of the appropriate range PA of lock-up control at the predetermined revolving speed Nd1 (at step S158 in the flowchart of FIG. 9). The target engine speed Ne* of the engine 50 is set equal to the predetermined revolving speed Nd1 (at step S148), and the engine 50 is thereby driven at a driving point Pe1 specified by the torque Te1 and the revolving speed Nd1. The torque command value Ta* of the assist motor 40, which is obtained by subtracting the target engine torque Te* (=Te1) from the output torque command value Td* (=Td1), is equal to a value Ta1 (at step S164). Energy supplied to the drive shaft 22 is accordingly equal to the sum (Td1×Nd1) of energy (Te1×Nd1) output from the engine 50 and transmitted via the clutch motor 30 and energy (Ta1×Nd1) applied by the assist motor 40. The energy applied by the assist motor 40 balances with electrical energy Gbo discharged from the battery 94.

In another example, it is assumed that the drive shaft 22 is rotated at a predetermined revolving speed Nd2 and the output torque command value Td* is equal to a value Td2; that is, it is required that the drive shaft 22 is driven at a driving point Pd2 in the graph of FIG. 10. Whereas the revolving speed Nd2 is within the appropriate range PA of lock-up control, the output torque command value Td*=Td2 is below the lower limit of the appropriate range PA. Under such conditions, the target engine torque Te* of the engine 50 is set equal to the lower limit torque T1 (=Te2) of the appropriate range PA of lock-up control at the predetermined revolving speed Nd2 (at step S156 in the flowchart of FIG. 9). The target engine speed Ne* of the engine 50 is set equal to the predetermined revolving speed Nd2 (at step S148), and the engine 50 is thereby driven at a driving point Pe2 specified by the torque Te2 and the revolving speed Nd2. The torque command value Ta* of the assist motor 40, which is obtained by subtracting the target engine torque Te*

(=Te2) from the output torque command value Td* (=Td2), is equal to a negative value Ta2 (at step S164). Energy supplied to the drive shaft 22 is accordingly equal to the difference (Td2×Nd2) obtained by subtracting energy (Ta2×Nd2) corresponding to electric power regenerated by the assist motor 40 from energy (Te2×Nd2) output from the engine 50 and transmitted via the clutch motor 30. Electric power regenerated by the assist motor 40 (=energy Gbi) is used to charge the battery 94.

As discussed above, the second lock-up control routine of FIG. 9 enables the power output apparatus 20 of the embodiment to attain the lock-up control even when the output torque command value Td* depending upon the step-on amount of the accelerator pedal 64 is out of the appropriate range PA of lock-up control of the engine 50, as long as the revolving speed Nd is within the appropriate range PA. The charge and discharge control of the battery 94 allows the assist motor 40 to be driven with the torque difference between the target engine torque Te* and the output torque command value Td*. A desired torque can thus be applied to the drive shaft 22.

The residual capacity BRM of the battery 94 is not specifically checked in the second lock-up control routine of FIG. 9. In accordance with another preferred structure, the lock-up control may not be implemented when the residual capacity BRM of the battery 94 is not greater than a lower threshold value BL subsequently representing the state of full discharge or is not less than an upper threshold value BH subsequently representing the state of full charge.

In both the first lock-up control routine of FIG. 5 and the second lock-up control routine of FIG. 9, a constant current Ic is continuously flown through the three-phase coils 36 of the clutch motor 30. The value of constant current Ic is determined depending upon the maximum torque ripple (maximum torque Tmax) of the engine 50 driven at the driving point specified by the revolving speed Nd and the output torque command value Td*. In accordance with one modified structure, the value of electric current flowing through the three-phase coils 36 of the clutch motor 30 may be varied with the torque ripple. By way of example, the process of step S110 in the first lock-up control routine of FIG. 5 or step S160 in the second lock-up control routine of FIG. 9 to compute the maximum torque ripple as the maximum torque Tmax may be replaced by the process of setting the maximum torque Tmax at step S180 in a modified lock-up control routine shown in the flowchart of FIG. 11. The following describes the modified lock-up control routine executed by the controller 80.

Figure 11:
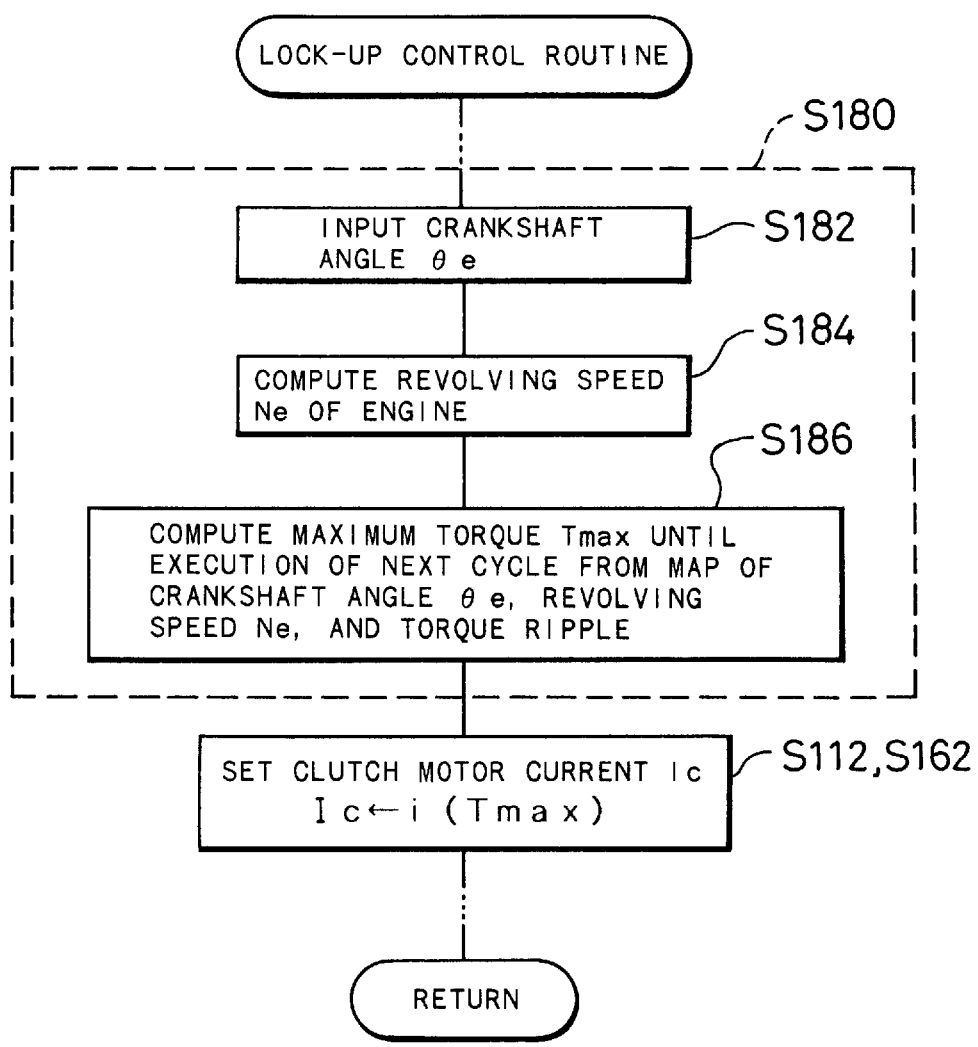
FIG. 11 is a flowchart showing steps executed by the controller 80 as a modification of either the first lock-up control routine of FIG. 5 or the second lock-up control routine of FIG. 9.

As shown in FIG. 11, the process of step S180 for setting the maximum torque Tmax includes steps S182 through S186. The control CPU 90 of the controller 80 first reads the rotational angle θe of the crankshaft 56 measured by the resolver 39 at step S182, and computes the revolving speed Ne of the engine 50 corresponding to the input rotational angle θe at step S184. The lock-up control routine is executed at predetermined time intervals (for example, every 1 msec). The revolving speed Ne of the engine 50 is computed from the previous data of rotational angle θe input in the previous cycle of the routine and the current data of rotational angle θe input in the current cycle.

Figure 12:
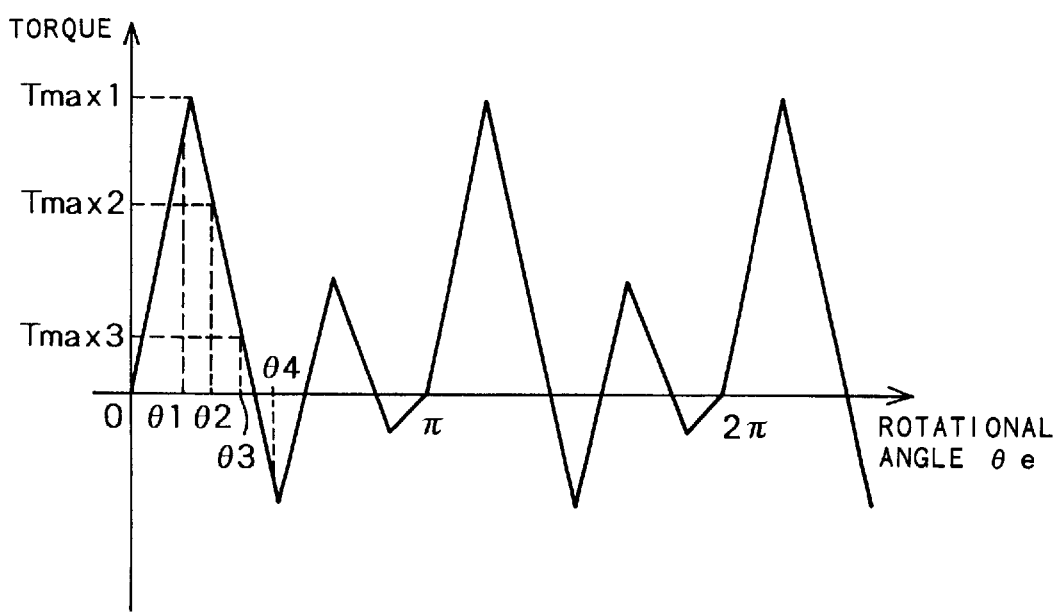
FIG. 12 is a graph showing the relationship between rotational angle θe of the crankshaft 56 and the torque ripple.

At subsequent step S186, the control CPU 90 calculates the maximum torque Tmax, which corresponds to the maximum torque ripple until the execution of the next cycle of this routine, based on the input rotational angle θe, the computed revolving speed Ne, and the waveform of torque ripple of the engine 50. Waveform data of torque ripple of the engine 50 have experimentally been obtained at each driving point of the engine 50 and stored in the ROM 90b. The following describes a concrete procedure of determining the maximum torque Tmax using the graph of FIG. 12, which shows the relationship between the rotational angle θe of the crankshaft 56 and the torque ripple.

By way of example, it is assumed that the engine 50 is a 4-cylinder engine and rotated at the revolving speed Ne=3000 rpm and that the lock-up control routine is executed at every 1 msec. When all the cylinders of the engine 50 are identical with one another, the period of torque ripple corresponds to the time when the crankshaft 56 is rotated semicircularly, that is, by the angle of $\pi$. The period of torque ripple is equal to 10 msec at the revolving speed Ne=3000 rpm. This means that the lock-up control routine is executed ten times in one cycle of torque ripple. Under such conditions, when the rotational angle θe of the crankshaft 56 input at step S182 in the flowchart of FIG. 11 is equal to a value θ1, next data θ2 of rotational angle θe is predicted for the next cycle of this routine. A maximum torque ripple Tmax1 in the range of the rotational angle θe from the value θ1 to the value θ2 is set as the maximum torque Tmax. When the rotational angle θe of the crankshaft 56 input at step S182 is equal to the value θ2, next data θ3 of rotational angle θe is predicted for the next cycle of this routine. A maximum torque ripple Tmax2 in the range of the rotational angle θe from the value θ2 to the value θ3 is set as the maximum torque Tmax. In this manner, the maximum torque Tmax is successively updated as Tmax1, Tmax2, Tmax3, . . . every time when this routine is executed.

After setting the maximum torque Tmax, the program returns to step S112 in the first lock-up control routine of FIG. 5 or step S162 in the second lock-up control routine of FIG. 9. The control CPU 90 sets the value of constant current Ic made to flow through the three-phase coils 36 of the clutch motor 30 based on the maximum torque Tmax thus obtained at step S112 or S162 and then executes the processing of subsequent steps.

The processing of step S180 in the flowchart of FIG. 11 for setting the maximum torque Tmax, which is incorporated in either the first lock-up control routine of FIG. 5 or the second lock-up control routine of FIG. 9 executed by the power output apparatus 20 of the embodiment, enables the maximum torque Tmax to be varied with the torque ripple of the engine 50. The value of electric current flowing through the three-phase coils 36 of the clutch motor 30 is accordingly varied with the torque ripple. Compared with the structure that the constant current Ic based on the maximum torque ripple is continuously made to flow through the three-phase coils 36 of the clutch motor 30, this modified structure can save the electric power consumed by the clutch motor 30, thereby attaining the lock-up control at a higher efficiency.

In the embodiment, the maximum torque Tmax is varied according to the torque ripple of the engine 50, based on the relationship between the input rotational angle θe of the crankshaft 56 and the waveform of the torque ripple. The rotational angle and the revolving speed of the crankshaft 56 measured by the angle sensor 78 and the speed sensor 76 mounted on the distributor 60 may be used in place of the rotational angle θe of the crankshaft 56. In accordance with another preferred structure, the period and timing of torque ripple are measured and an electric current corresponding to a variation in torque ripple previously stored in the ROM 90b is made to flow through the three-phase coils 36 of the clutch motor 30 at the measured timing. In this case, the timing of torque ripple may be measured with the resolver 39 attached to the crankshaft 56 or the angle sensor 78 mounted on the distributor 60, or alternatively determined by measuring a high voltage supplied from the igniter 58 via the distributor 60 as a signal.

Figure 13:
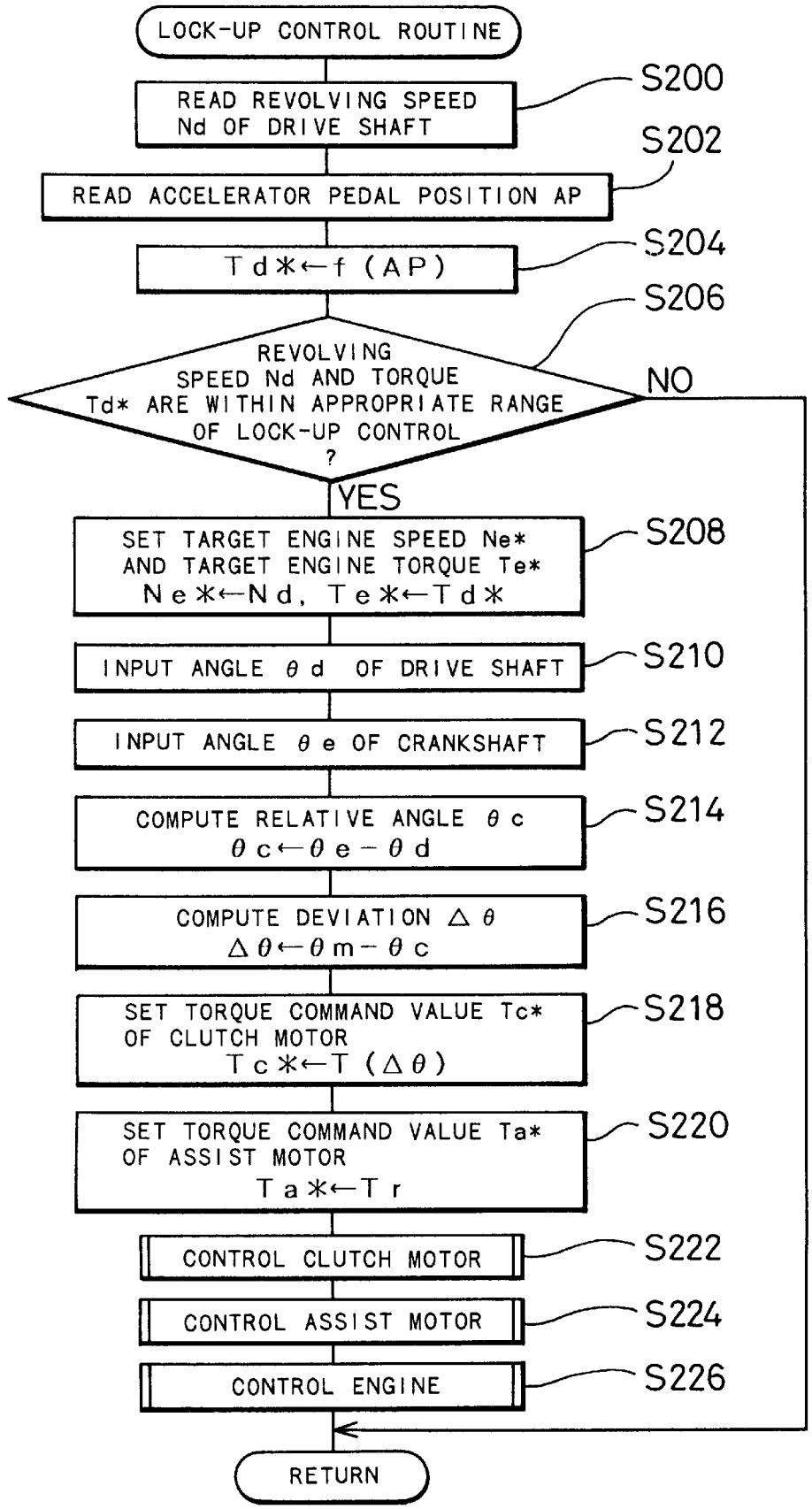
FIG. 13 is a flowchart showing a third lock-up control routine executed by the controller 80 in the first embodiment.

In the power output apparatus 20 of the embodiment, both the first lock-up control routine of FIG. 5 and the second lock-up control routine of FIG. 9 make a constant current flow through the three-phase coils 36 of the clutch motor 30 with a view to locking up the clutch motor 30. In accordance with another preferred structure, the relative position of the outer rotor 32 to the inner rotor 34 or alternatively the relative position of the inner rotor 34 to the outer rotor 32 is measured, and the clutch motor 30 is controlled to make the relative position approach a predetermined position. In order to attain such position-based lock-up control, a third lock-up control routine illustrated in the flowchart of FIG. 13 may be executed in place of the first lock-up control routine of FIG. 5 or the second lock-up control routine of FIG. 9. The processing of steps S200 through S208 in the third lock-up control routine of FIG. 13 is identical with that of steps S100 through S108 in the first lock-up control routine of FIG. 5. The following describes the control procedure after step S208.

After setting the target engine speed Ne* and the target engine torque Te* of the engine 50 at step S208 in the third lock-up control routine of FIG. 13, the control CPU 90 of the controller 80 reads the rotational angle θd of the drive shaft 22 from the resolver 48 at step S210 and the rotational angle θe of the crankshaft 56 of the engine 50 from the resolver 39 at step S212. The control CPU 90 then computes a relative angle θc as the difference between the rotational angle θe of the crankshaft 56 and the rotational angle θd of the drive shaft 22 according to the equation of θc=θe−θd at step S214. At subsequent step S216, a deviation Δθ of the relative angle θc from a target angle θm is calculated by the equation of Δθ=θm−θc. The target angle θm is an angle at which the magnetic poles produced by the permanent magnets 35 on the outer rotor 32 are opposed to the magnetic poles of different magnetism produced by the three-phase coils 36 on the inner rotor 34. At the target angle θm, the electrical angle of rotors is equal to zero.

The control CPU 90 sets the torque command value Tc* of the clutch motor 30 based on the deviation Δθ at step S218, in order to enable the clutch motor 30 to apply the torque which can cancel the deviation Δθ. Setting the torque command value Tc* of the clutch motor 30 in this manner cancels the deviation Δθ and keeps the relative angle θc, which is the difference between the rotational angle θe of the crankshaft 56 and the rotational angle θd of the drive shaft 22, at the target angle θm. The torque command value Ta* of the assist motor 40 is then set equal to a predetermined negative value Tr at step S220. The predetermined negative value Tr allows the assist motor 40 to regenerate electric power, which is substantially equivalent to the electric power consumed by the clutch motor 30.

After setting the torque command values and the target engine values, the control CPU 90 controls the clutch motor 30 at step S222, the assist motor 40 at step S224, and the engine 50 at step S226. The assist motor control (step S224) and the engine control (step S226) are carried out in the same manner as the assist motor control (step S118) and the engine control (step S120) in the first lock-up control routine of FIG. 5. The clutch motor control (step S222) is implemented according to a clutch motor control routine shown in the flowchart of FIG. 14.

When the program enters the clutch motor control routine, the control CPU 90 of the controller 80 first reads the rotational angle θd of the drive shaft 22 from the resolver 48 at step S230 and the rotational angle θe of the crankshaft 56 of the engine 50 from the resolver 39 at step S232. A relative angle θc is computed as the difference between the rotational angle θd of the drive shaft 22 and the rotational angle θe of the crankshaft 56 by the equation θc=θee−θd at step S234. At subsequent step S236, the control CPU 90 receives data of clutch motor currents Iuc and Ivc, which respectively flow through the U phase and V phase of the three-phase coils 36 in the clutch motor 30, from the ammeters 95 and 96. The control CPU 90 then executes transformation of coordinates for the currents of the three phases at step S238, computes voltage command values Vdc and Vqc at step S240, and executes inverse transformation of coordinates for the voltage command values at step S242. At subsequent step S246, the control CPU 90 determines the on- and off-time of the transistors Tr1 through Tr6 in the first driving circuit 91 for PWM (pulse width modulation) control. The processing executed at steps S238 through S246 is similar to that executed at steps S134 through S139 of the assist motor control routine shown in the flowchart of FIG. 8.

Figure 14:
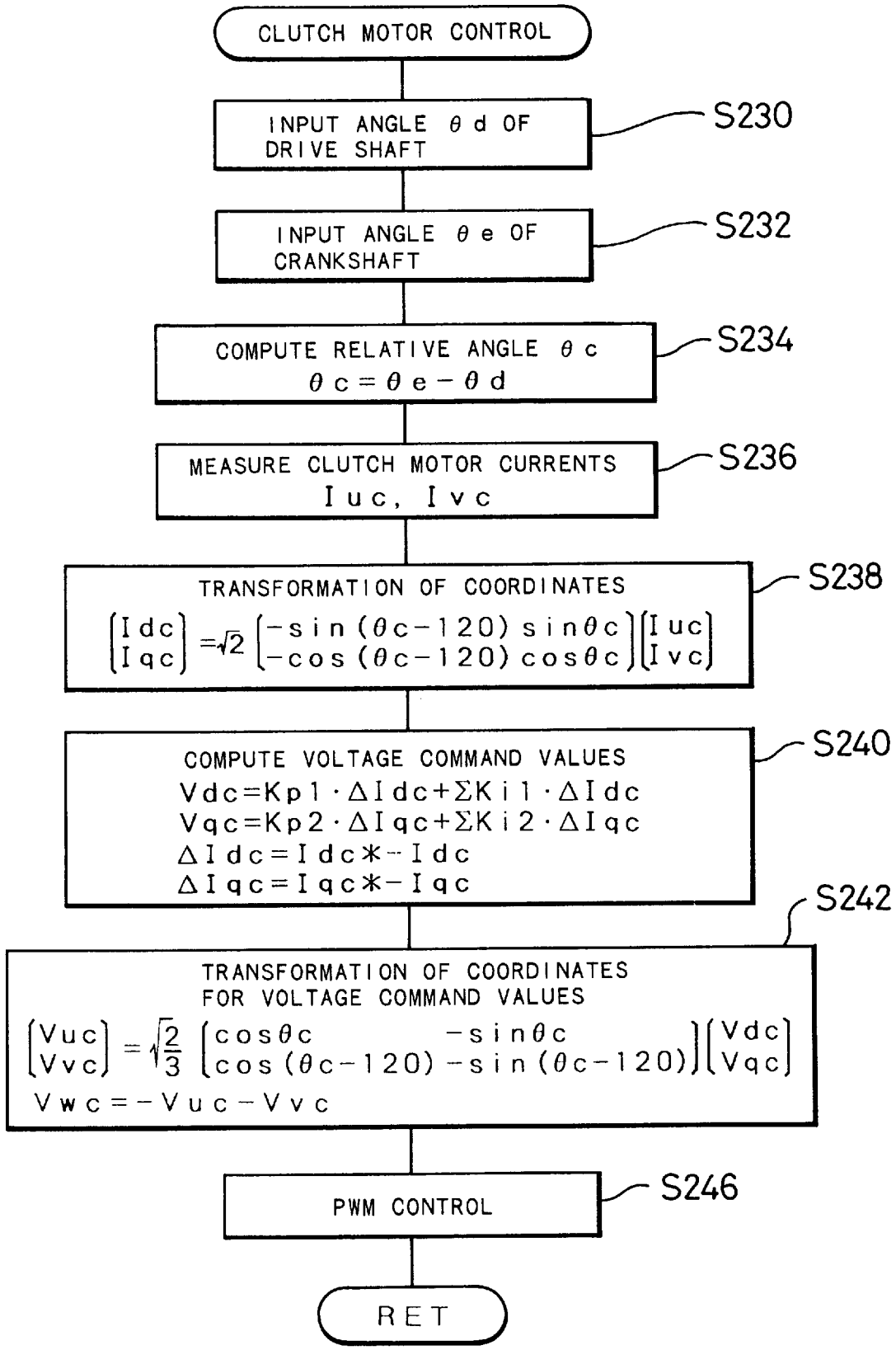
FIG. 14 is a flowchart showing details of the control process of the clutch motor 30 executed at step S222 in the third lock-up control routine of FIG. 13.

The torque command value Tc* is positive when a positive torque is applied to the drive shaft 22 in the direction of rotation of the crankshaft 56. By way of example, it is assumed that a positive value is set to the torque command value Tc*. When the revolving speed Ne of the engine 50 is greater than the revolving speed Nd of the drive shaft 22 on this assumption, that is, when the revolving speed difference Nc (=Ne−Nd) is positive, the clutch motor 30 is controlled to carry out the regenerative operation and produce a regenerative current corresponding to the revolving speed difference Nc. When the revolving speed Ne of the engine 50 is less than the revolving speed Nd of the drive shaft 22, that is, when the revolving speed difference Nc (=Ne−Nd) is negative, on the contrary, the clutch motor 30 is controlled to carry out the power operation and rotate relative to the crankshaft 56 in the direction of rotation of the drive shaft 22 at a revolving speed defined by the absolute value of the revolving speed difference Nc. For the positive torque command value Tc*, both the regenerative operation and the power operation of the clutch motor 30 implement the identical switching control. In accordance with a concrete procedure, the transistors Tr1 through Tr6 of the first driving circuit 91 are controlled to enable a positive torque to be applied to the drive shaft 22 by the combination of the magnetic field generated by the permanent magnets 35 set on the outer rotor 32 with the rotating magnetic field generated by the currents flowing through the three-phase coils 36 on the inner rotor 34 in the clutch motor 30. The identical switching control is executed for both the regenerative operation and the power operation of the clutch motor 30 as long as the sign of the torque command value Tc* is not changed. The clutch motor control routine of FIG. 14 is thus applicable to both the regenerative operation and the power operation. Under the condition of braking the drive shaft 22 or moving the vehicle in reverse, the torque command value Tc* has the negative sign. The clutch motor control routine of FIG. 14 is also applicable to the control procedure under such conditions, when the relative angle θc is varied in the reverse direction at step S234.

As discussed above, the third lock-up control routine of FIG. 13 executed by the power output apparatus 20 of the embodiment controls the relative position of the outer rotor 32 to the inner rotor 34 or alternatively the relative position of the inner rotor 34 to the outer rotor 32 to make the relative position approach the predetermined position, thereby locking up the clutch motor 30. The third lock-up control routine of FIG. 13 also enables the power output from the engine 50 to be directly transmitted to the drive shaft 22.

In the third lock-up control routine of FIG. 13, the rotational angle θd of the drive shaft 22 and the rotational angle θe of the crankshaft 56 are measured respectively with the resolvers 48 and 39. In accordance with another preferred structure, the deviation Δθ of the relative angle θc from the target angle θm may be estimated according to a displacement of electric currents measured by the ammeters 95 and 96.

Figure 15:
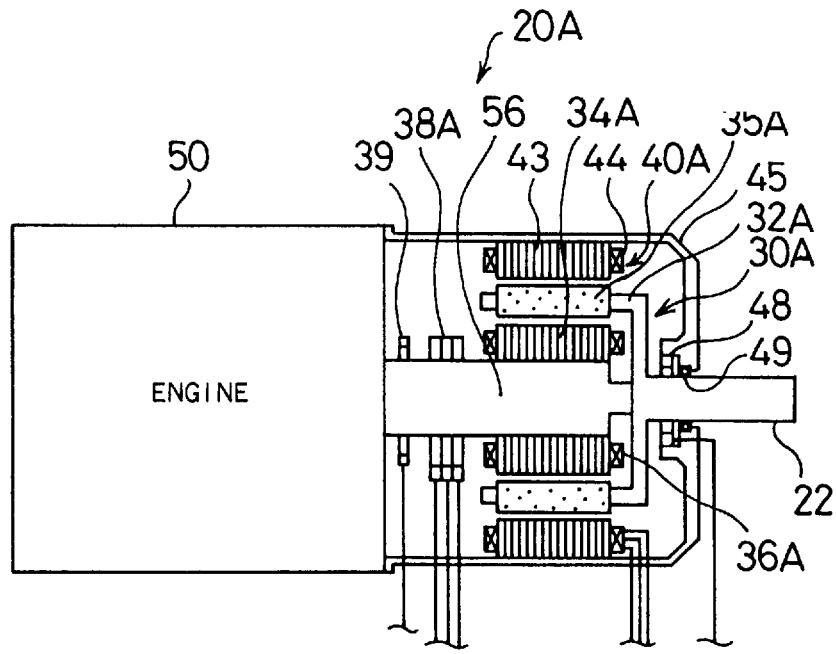
FIG. 15 schematically illustrates a power output apparatus 20A as a modification of the first embodiment.

In the structure of the power output apparatus 20 shown in FIG. 1, the clutch motor 30 and the assist motor 40 are separately attached to the different positions of the drive shaft 22. Like a modified power output apparatus 20A illustrated in FIG. 15, however, the clutch motor and the assist motor may integrally be joined with each other. A clutch motor 30A of the power output apparatus 20A includes an inner rotor 34A connecting with the crankshaft 56 and an outer rotor 32A linked with the drive shaft 22. Three-phase coils 36A are attached to the inner rotor 34A, and permanent magnets 35A are set on the outer rotor 32A in such a manner that the outer surface and the inner surface thereof have different magnetic poles. An assist motor 40A includes the outer rotor 32A of the clutch motor 30A and a stator 43 with three-phase coils 44 mounted thereon. In this structure, the outer rotor 32A of the clutch motor 30A also works as a rotor of the assist motor 40A. Since the three-phase coils 36A are mounted on the inner rotor 34A connecting with the crankshaft 56, a rotary transformer 38A for supplying electric power to the three-phase coils 36A of the clutch motor 30A is attached to the crankshaft 56.

In the power output apparatus 20A, the voltage applied to the three-phase coils 36A on the inner rotor 34A is controlled against the inner-surface magnetic poles of the permanent magnets 35A set on the outer rotor 32A. This allows the clutch motor 30A to work in the same manner as the clutch motor 30 of the power output apparatus 20 shown in FIG. 1. The voltage applied to the three-phase coils 44 on the stator 43 is controlled against the outer-surface magnetic poles of the permanent magnets 35A set on the outer rotor 32A. This allows the assist motor 40A to work in the same manner as the assist motor 40 of the power output apparatus 20. The lock-up control and all the other control procedures discussed above are also applicable to the power output apparatus 20A shown in FIG. 15, which accordingly implements the same operations and exerts the same effects as those of the power output apparatus 20 shown in FIG. 1.

As discussed above, the outer rotor 32A functions concurrently as one of the rotors in the clutch motor 30A and as the rotor of the assist motor 40A, thereby effectively reducing the size and weight of the whole power output apparatus 20A.

Figure 16:
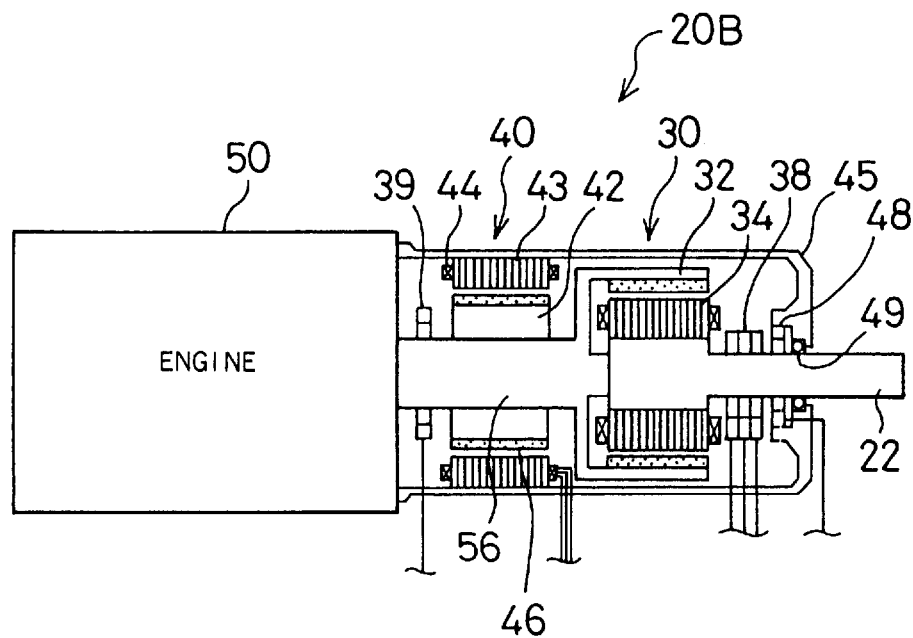
FIG. 16 schematically illustrates structure of another power output apparatus 20B as a second embodiment according to the present invention.

FIG. 16 schematically illustrates an essential part of another power output apparatus 20B as a second embodiment of the present invention. The power output apparatus 20B of FIG. 16 has a similar structure to that of the power output apparatus 20 of FIG. 1, except that the assist motor 40 is attached to the crankshaft 56 placed between the engine 50 and the clutch motor 30. In the power output apparatus 20B of the second embodiment, like numerals and symbols denote like elements as those of the power output apparatus 20 of FIG. 1. The symbols used in the description have like meanings unless otherwise specified.

The following describes the essential operation of the power output apparatus 20B shown in FIG. 16. By way of example, it is assumed that the engine 50 is driven at a driving point specified by the torque Te=T1 and the revolving speed Ne=N1 on the torque-revolving speed curve (constant output energy curve) of FIG. 4 and that the drive shaft 22 is rotated at the revolving speed Nd=N2. When a torque Ta (=T2−T1) is added to the crankshaft 56 by the assist motor 40 linked with the crankshaft 56, the energy corresponding to the sum of the regions G2 and G3 in the graph of FIG. 4 is supplied to the crankshaft 56. The torque acting on the crankshaft 56 is accordingly equal to the value T2 (=T1+Ta). When the torque Tc of the clutch motor 30 is controlled to be equal to the value T2, the torque Tc (=T1+Ta) is transmitted to the drive shaft 22. The clutch motor 30 concurrently regenerates electric power based on the revolving speed difference Nc between the revolving speed Ne of the engine 50 and the revolving speed Nd of the drive shaft 22. The regenerated power corresponds to energy expressed as the sum of the regions G1 and G3. The torque Ta of the assist motor 40 is set to be substantially equivalent to the electric power regenerated by the clutch motor 30. The regenerated power is supplied to the assist motor 40 via the power lines P1 and P2 and the second driving circuit 92 to activate the assist motor 40.

In another example, it is assumed that the engine 50 is driven at a driving point specified by the torque Te=T2 and the revolving speed Ne=N2 in the graph of FIG. 4 and that the drive shaft 22 is rotated at the revolving speed Nd=N1. When the torque Ta of the assist motor 40 is controlled to be equal to (T2−T1), the assist motor 40 carries out the regenerative operation and regenerates the energy (electric power) corresponding to the region G2 in the graph of FIG. 4 via the crankshaft 56. The clutch motor 30 functions as a normal motor, when the inner rotor 34 rotates relative to the outer rotor 32 at a revolving speed defined by the revolving speed difference Nc (=N1−N2) in the direction of rotation of the drive shaft 22. The clutch motor 30 accordingly supplies the energy of region G1 corresponding to the revolving speed difference Nc as the energy of rotational motion to the drive shaft 22. The torque Ta of the assist motor 40 is set in such a manner that the electric power regenerated by the assist motor 40 can substantially compensate for the electric power consumed by the clutch motor 30. The clutch motor 30 can thus be driven by the electric power regenerated by the assist motor 40.

In the power output apparatus 20B of the second embodiment, the torque Ta of the assist motor 40 and the torque Tc of the clutch motor 30 are regulated to fulfill Equations (5) and (6) given as:

$$Te \times Ne = Tc \times Nd \quad (5)$$

$$Te + Ta = Tc = Td \quad (6)$$

Like the power output apparatus 20 of the first embodiment, this enables energy output from the engine 50 to undergo the free torque conversion and be supplied to the drive shaft 22. The relationships of Equations (5) and (6) represent the ideal state when both the clutch motor 30 and the assist motor 40 have the efficiency of 100%. In the actual state, (Tc×Nd) and Ta become a little smaller.

Figure 17:
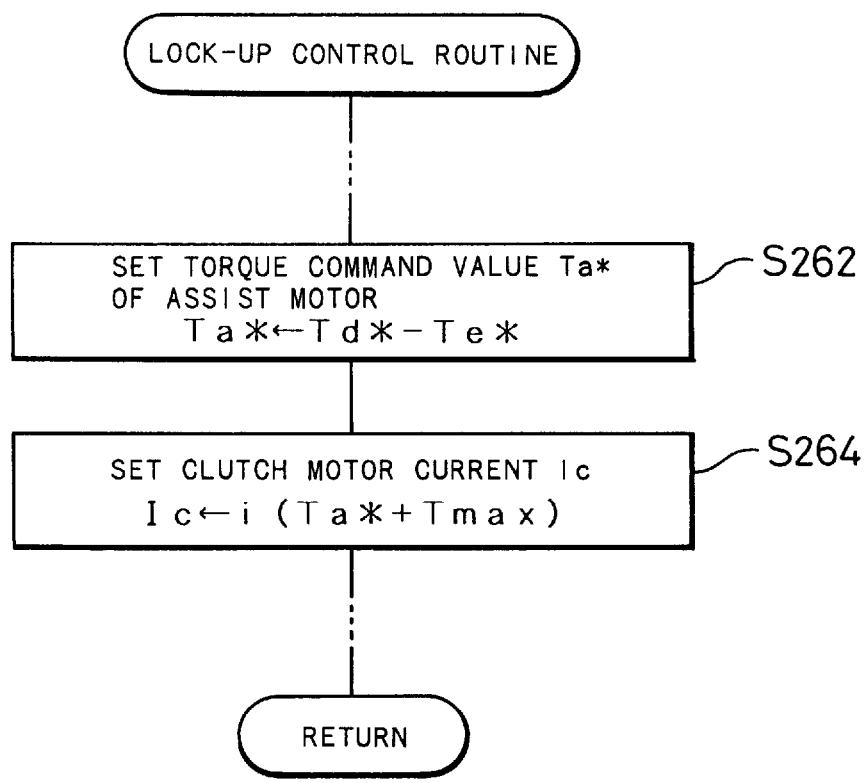
FIG. 17 is a flowchart showing steps executed by the controller 80 of the power output apparatus 20B of the second embodiment, in place of some steps in the second lock-up control routine of FIG. 9.

The first lock-up control routine of FIG. 5, the second lock-up control routine of FIG. 9, and the third lock-up control routine of FIG. 13 are applicable to the power output apparatus 20B of the second embodiment as well as the power output apparatus 20 of the first embodiment. When the second lock-up control routine of FIG. 9 is applied to the power output apparatus 20B, however, the processing of steps S162 and S164 should be replaced by that of steps S262 and S264 shown in the flowchart of FIG. 17. Such difference is ascribed to the arrangement of the second embodiment, in which the assist motor 40 is linked with the crankshaft 56 of the engine 50. In the power output apparatus 20B of the second embodiment, the torque command value Ta* of the assist motor 40 is set by subtracting the target engine torque Te* from the output torque command value Td* at step S262. The control CPU 90 then determines the value of constant current Ic made to flow through the three-phase coils 36 of the clutch motor 30, based on the sum of the torque command value Ta* preset at step S262 and the maximum torque Tmax of the engine 50, which corresponds to the maximum torque ripple. This structure enables the sum of the torque Te output from the engine 50 and the torque Ta applied to the crankshaft 56 by the assist motor 40 to be directly transmitted to the drive shaft 22.

The power output apparatus 20B of the second embodiment exerts the same effects as those of the power output apparatus 20 of the first embodiment. The first lock-up control routine of FIG. 5 allows the power output from the engine 50 to be directly transmitted to the drive shaft. The second lock-up control routine of FIG. 9 attains the lock-up control even when the output torque command value Td* depending upon the step-on amount of the accelerator pedal 64 is out of the appropriate range PA of lock-up control of the engine 50, as long as the revolving speed Nd of the drive shaft 22 is within the appropriate range. The third lock-up control routine of FIG. 13 controls the relative position of the outer rotor 32 to the inner rotor 34 or alternatively the relative position of the inner rotor 34 to the outer rotor 32 to make the relative position approach the predetermined position, thereby locking up the clutch motor 30 and enabling the power output from the engine 50 to be directly transmitted to the drive shaft 22.

In place of the processing of step S110 in the first lock-up control routine of FIG. 5 or step S160 in the second lock-up control routine of FIG. 9, the processing of step S180 in the modified lock-up control routine of FIG. 11 may be applied to the power output apparatus 20B of the second embodiment. This allows the value of electric current flowing through the three-phase coils 36 of the clutch motor 30 to be varied with the torque ripple.

Figure 18:
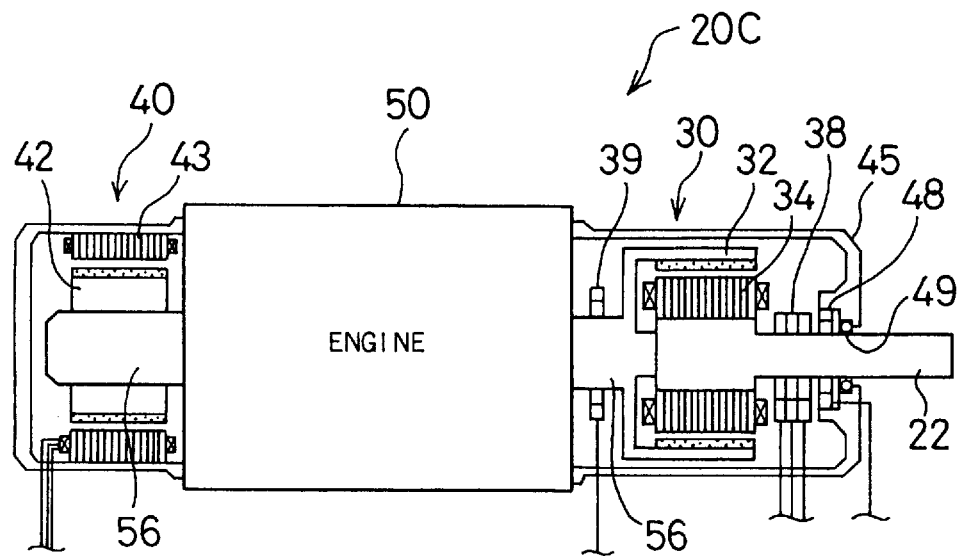
FIG. 18 schematically illustrates a power output apparatus 20C as a modification of the second embodiment.

In the power output apparatus 20B of FIG. 16 given as the second embodiment discussed above, the assist motor 40 is attached to the crankshaft 56 placed between the engine 50 and the clutch motor 30. Like another power output apparatus 20C illustrated in FIG. 18, however, the engine 50 may be interposed between the clutch motor 30 and the assist motor 40.

Figure 19:
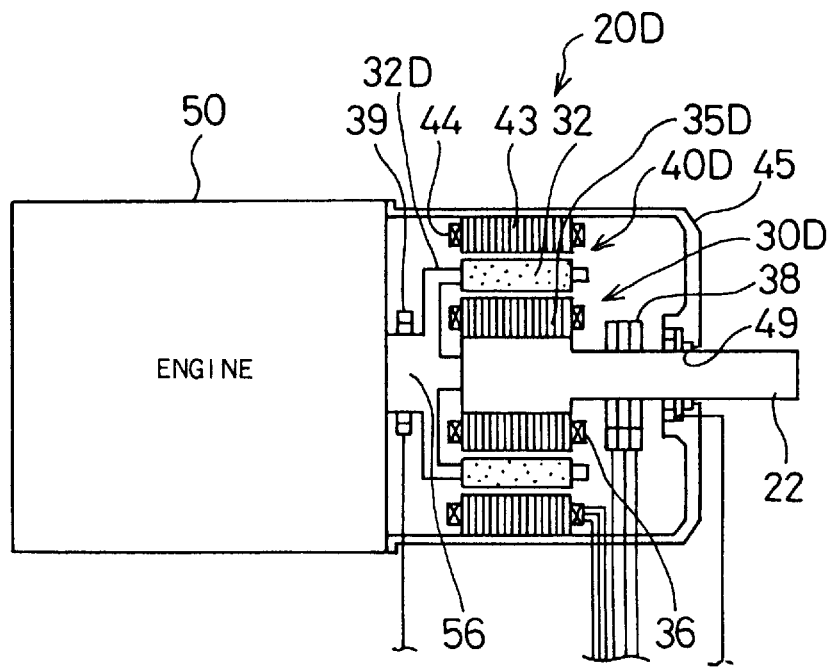
FIG. 19 schematically illustrates a power output apparatus 20D as another modification of the second embodiment.

In the power output apparatus 20B of FIG. 16, the clutch motor 30 and the assist motor 40 are separately attached to the different positions of the crankshaft 56. Like a power output apparatus 20D shown in FIG. 19, however, the clutch motor and the assist motor may integrally be joined with each other. In the power output apparatus 20D of FIG. 19, an outer rotor 32D of a clutch motor 30D also works as a rotor of an assist motor 40D. The voltage applied to the three-phase coils 36 on the inner rotor 34 is controlled against the inner-surface magnetic poles of permanent magnets 35D set on the outer rotor 32D. This allows the clutch motor 30D to work in the same manner as the clutch motor 30 of the power output apparatus 20B of the second embodiment. The voltage applied to the three-phase coils 44 on the stator 43 is controlled against the outer-surface magnetic poles of the permanent magnets 35D set on the outer rotor 32D. This allows the assist motor 40D to work in the same manner as the assist motor 40 of the power output apparatus 20B. The power output apparatus 20D of FIG. 19 has similar operations and effects to those of the power output apparatus 20B of the second embodiment. The integral arrangement of the clutch motor 30D and the assist motor 40D effectively reduces the size and weight of the whole power output apparatus 20D.

There may be many other modifications, alternations, and changes without departing from the scope or spirit of essential characteristics of the invention. It is thus clearly understood that the above embodiments are only illustrative and not restrictive in any sense.

Figure 20:
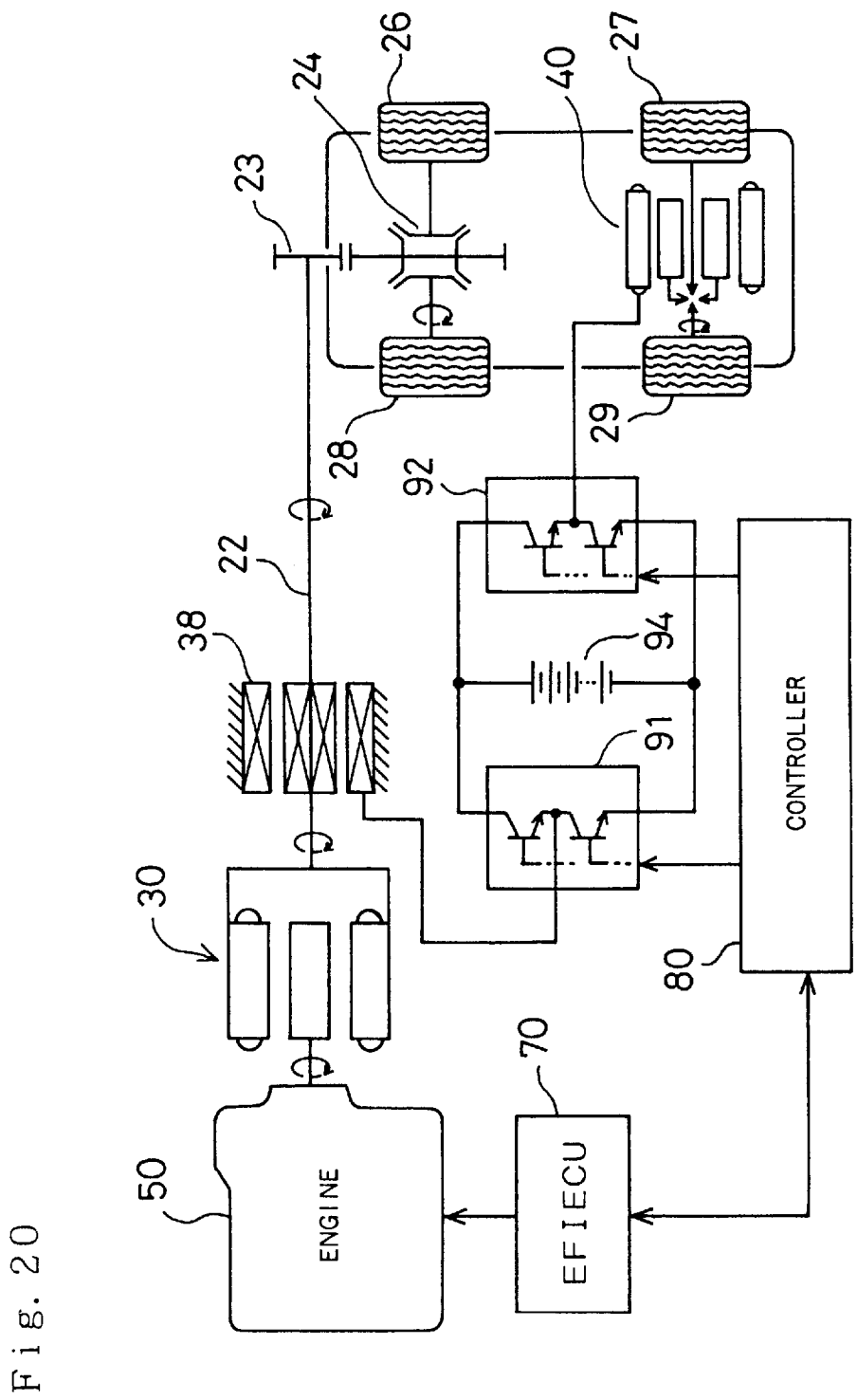
FIG. 20 shows application of the power output apparatus 20 of FIG. 1 to a vehicle with a four-wheel drive.

For example, the power output apparatus 20 of FIG. 1 is applicable to the vehicle with a four-wheel drive (4WD) as shown in FIG. 20. In the structure of FIG. 20, the assist motor 40, which is mechanically linked with the drive shaft 22 in the structure of FIG. 1, is separated from the drive shaft 22 and independently disposed in a rear-wheel portion of the vehicle in order to drive rear driving wheels 27 and 29. One end of the drive shaft 22 is linked with a differential gear 24 via a gear 23 in order to drive front driving wheels 26 and 28. The control procedures of the first embodiment are also applicable to the structure of FIG. 20.

The gasoline engine driven by means of gasoline is used as the engine 50 in the above power output apparatuses. The principle of the invention is, however, applicable to other internal combustion engines and external combustion engines, such as Diesel engines, turbine engines, and jet engines.

Permanent magnet (PM)-type synchronous motors are used for the clutch motor 30 and the assist motor 40 in the power output apparatuses described above. Other motors such as variable reluctance (VR)-type synchronous motors, vernier motors, d.c. motors, induction motors, superconducting motors, and stepping motors may be used for the regenerative operation and the power operation.

The rotary transformer 38 used as means for transmitting electric power to the clutch motor 30 may be replaced by a slip ring-brush contact, a slip ring-mercury contact, a semiconductor coupling of magnetic energy, or the like.

In the above power output apparatuses, transistor inverters are used for the first and the second driving circuits 91 and 92. Other examples applicable to the driving circuits 91 and 92 include IGBT (insulated gate bipolar mode transistor) inverters, thyristor inverters, voltage PWM (pulse width modulation) inverters, square-wave inverters (voltage inverters and current inverters), and resonance inverters.

The battery 94 may include Pb cells, NiMH cells, Li cells, or the like cells. A capacitor may be used in place of the battery 94.

Although the power output apparatus is mounted on the vehicle in the above embodiments, it may be mounted on other transportation means like ships and airplanes as well as a variety of industrial machines.

The scope and spirit of the present invention are limited only by the terms of the appended claims.

What is claimed is:

1. A power output apparatus for outputting power to a drive shaft, said power output apparatus comprising:

an engine having an output shaft;

a clutch motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via the electromagnetic connection of said first and second rotors;

a clutch motor-driving circuit for controlling a degree of electromagnetic connection of said first rotor and said second rotor in said clutch motor and regulating the rotation of said second rotor relative to said first rotor; and lock-up state control means for controlling said clutch motor via said clutch motor-driving circuit, in order to make said clutch motor in a lock-up state wherein said second rotor is not rotated relative to said first rotor.

2. A power output apparatus in accordance with claim 1, said power output apparatus further comprising:

drive shaft revolving speed measuring means for measuring a revolving speed of said drive shaft;

target torque setting means for setting a target torque, which is applied to said drive shaft, based on an instruction of a driver; and determination means for determining whether a combination of the revolving speed of said drive shaft measured by said drive shaft revolving speed measuring means and the target torque set by said target torque setting means is a combination within a predetermined range, wherein said lock-up state control means comprises means for controlling said clutch motor via said clutch motor-driving circuit, in order to make said clutch motor in a lock-up state wherein said second rotor is not rotated relative to said first rotor, when it is determined by said determination means that the combination of the revolving speed of said drive shaft and the target torque is a combination within a predetermined range.

3. A power output apparatus in accordance with claim 2, wherein the combination of said predetermined range is a combination of a revolving speed and a torque which can be stably output from said engine to said output shaft of said engine.

4. A power output apparatus in accordance with claim 1, said power output apparatus further comprising:

electric power regeneration means arranged on said drive shaft for regenerating electric power via said drive shaft;

wherein said lock-up state control means comprises means for controlling said electric power regeneration means, in order to allow the electric power regenerated by said electric power regeneration means to compensate for at least part of electric power required for the control of said clutch motor.

5. A power output apparatus in accordance with claim 1, said power output apparatus further comprising:

electric power regeneration means arranged on said output shaft of said engine for regenerating electric power via said output shaft;

wherein said lock-up state control means comprises means for controlling said electric power regeneration means, in order to allow the electric power regenerated by said electric power regeneration means to compensate for at least part of electric power required for the control of said clutch motor.

6. A power output apparatus in accordance with claim 1, said power output apparatus further comprising:

an assist motor connected with said drive shaft;

an assist motor-driving circuit for driving and controlling said assist motor;

a storage battery being charged with electric power regenerated by said assist motor via said assist motor-driving circuit and discharging electric power required to drive said assist motor via said assist motor-driving circuit;

target torque setting means for setting a target torque, which is applied to said drive shaft, based on an instruction of a driver;

drive shaft revolving speed measuring means for measuring a revolving speed of said drive shaft;

engine driving torque setting means for setting a driving torque of said engine based on the revolving speed of said drive shaft measured by said drive shaft revolving speed measuring means and the target torque set by said target torque setting means;

engine drive control means for controlling said engine so as to allow said engine to be driven with the driving torque set by said engine driving torque setting means; and additional torque control means for controlling said assist motor via said assist motor-driving circuit by utilizing charge and discharge electric power of said storage battery, in order to enable a torque expressed as a difference between the target torque set by said target torque setting means and the driving torque set by said engine driving torque setting means to be applied to said drive shaft by said assist motor.

7. A power output apparatus in accordance with claim 6, said power output apparatus further comprising:

determination means for determining whether the revolving speed of said drive shaft measured by said drive shaft revolving speed measuring means is within a predetermined range, wherein said lock-up state control means comprises means for controlling said clutch motor via said clutch motor-driving circuit, in order to make said clutch motor in a lock-up state wherein said second rotor is not rotated relative to said first rotor, when it is determined by said determination means that the revolving speed of said drive shaft is within a predetermined range.

8. A power output apparatus in accordance with claim 6, said power output apparatus further comprising:

storage battery state measuring means for measuring a state of said storage battery, wherein said lock-up state control means comprises means for controlling said clutch motor via said clutch motor-driving circuit, in order to make said clutch motor in a lock-up state wherein said second rotor is not rotated relative to said first rotor, when the state of said storage battery measured by said storage battery state measuring means is within a predetermined range.

9. A power output apparatus in accordance with claim 1, said power output apparatus further comprising:

an assist motor connected with said output shaft of said engine;

an assist motor-driving circuit for driving and controlling said assist motor;

a storage battery being charged with electric power regenerated by said assist motor via said assist motor-driving circuit and discharging electric power required to drive said assist motor via said assist motor-driving circuit;

target torque setting means for setting a target torque, which is applied to said drive shaft, based on an instruction of a driver;

drive shaft revolving speed measuring means for measuring a revolving speed of said drive shaft;

engine driving torque setting means for setting a driving torque of said engine based on the revolving speed of said drive shaft measured by said drive shaft revolving speed measuring means and the target torque set by said target torque setting means;

engine drive control means for controlling said engine so as to allow said engine to be driven with the driving torque set by said engine driving torque setting means; and additional torque control means for controlling said assist motor via said assist motor-driving circuit by utilizing charge and discharge electric power of said storage battery, in order to enable a torque expressed as a difference between the target torque set by said target torque setting means and the driving torque set by said engine driving torque setting means to be applied to said output shaft of said engine by said assist motor.

10. A power output apparatus in accordance with claim 9, said power output apparatus further comprising:

determination means for determining whether the revolving speed of said drive shaft measured by said drive shaft revolving speed measuring means is within a predetermined range, wherein said lock-up state control means comprises means for controlling said clutch motor via said clutch motor-driving circuit, in order to make said clutch motor in a lock-up state wherein said second rotor is not rotated relative to said first rotor, when it is determined by said determination means that the revolving speed of said drive shaft is within a predetermined range.

11. A power output apparatus in accordance with claim 1, wherein said lock-up state control means comprises means for controlling said clutch motor via said clutch motor driving circuit, in order to make a relative position of said second rotor to said first rotor approach a predetermined position.

12. A power output apparatus in accordance with claim 11, wherein said lock-up state control means further comprises:

position measuring means for measuring the relative position of said second rotor to said first rotor; and position control means for controlling said clutch motor via said clutch motor driving circuit, in order to make the relative position measured by said position measuring means approach the predetermined position.

13. A power output apparatus in accordance with claim 1, wherein said lock-up state control means comprises means for controlling said clutch motor via said clutch motor driving circuit, in order to make the magnetism of magnetic poles produced on said first rotor and said second rotor of said clutch motor constant.

14. A power output apparatus in accordance with claim 13, wherein said lock-up state control means comprises means for controlling the magnitude of the magnetic poles produced on said first rotor and said second rotor of said clutch motor, based on the power output from said engine.

15. A power output apparatus in accordance with claim 13, wherein said engine outputs pulsating power; and wherein said lock-up state control means comprising means for controlling the magnitude of the magnetic poles produced on said first rotor and said second rotor of said clutch motor, based on the pulsation of the output power from said engine.

16. A power output apparatus in accordance with claim 15, wherein said power output apparatus further comprising:

timing measuring means for measuring a timing of the pulsation of the output power from said engine; and torque variation memory means for storing a variation in torque acting on said output shaft of said engine, said variation depending upon the pulsation of the output power from said engine, wherein said lock-up state control means comprises means for controlling the magnitude of the magnetic poles based on the timing measured by said timing measuring means and the variation in torque stored in said torque variation memory means.

17. A power output apparatus for outputting power to a drive shaft, said power output apparatus comprising:

an engine having an output shaft;

a complex motor comprising a first rotor connected with said output shaft of said engine, a second rotor connected with said drive shaft being coaxial to and rotatable relative to said first rotor, and a stator for rotating said second rotor, said first rotor and said second rotor constituting a clutch motor whereby power is transmitted between said output shaft of said engine and said drive shaft via an electromagnetic connection of said first rotor and said second rotor, said second rotor and said stator constituting an assist motor for supplying additional power to said drive shaft via said second rotor;

a clutch motor-driving circuit for driving and controlling said clutch motor in said complex motor;

an assist motor-driving circuit for driving and controlling said assist motor in said complex motor;

a storage battery being charged with electric power regenerated by said assist motor via said assist motor-driving circuit and discharging electric power required to drive said assist motor via said assist motor-driving circuit;

target torque setting means for setting a target torque, which is applied to said drive shaft, based on an instruction of a driver;

drive shaft revolving speed measuring means for measuring a revolving speed of said drive shaft;

engine driving torque setting means for setting a driving torque of said engine based on the revolving speed of said drive shaft measured by said drive shaft revolving speed measuring means and the target torque set by said target torque setting means;

engine drive control means for controlling said engine so as to allow said engine to be driven with the driving torque set by said engine driving torque setting means;

lock-up state control means for controlling said clutch motor via said clutch motor-driving circuit, in order to make said clutch motor in a lock-up state wherein said second rotor is not rotated relative to said first rotor; and additional torque control means for controlling said assist motor via said assist motor-driving circuit by utilizing charge and discharge electric power of said storage battery, in order to enable a torque expressed as a difference between the target torque set by said target torque setting means and the driving torque set by said engine driving torque setting means to be applied by said assist motor to said drive shaft via said second rotor.

18. A power output apparatus for outputting power to a drive shaft, said power output apparatus comprising:

an engine having an output shaft;

a complex motor comprising a first rotor connected with said output shaft of said engine, a second rotor connected with said drive shaft being coaxial to and rotatable relative to said first rotor, and a stator for rotating said second rotor, said first rotor and said second rotor constituting a clutch motor whereby power is transmitted between said output shaft of said engine and said drive shaft via an electromagnetic connection of said first rotor and said second rotor, said first rotor and said stator constituting an assist motor for supplying additional power to said output shaft of said engine via said first rotor;

a clutch motor-driving circuit for driving and controlling said clutch motor in said complex motor;

an assist motor-driving circuit for driving and controlling said assist motor in said complex motor;

a storage battery being charged with electric power regenerated by said assist motor via said assist motor-driving circuit and discharging electric power required to drive said assist motor via said assist motor-driving circuit;

target torque setting means for setting a target torque, which is applied to said drive shaft, based on an instruction of a driver;

drive shaft revolving speed measuring means for measuring a revolving speed of said drive shaft;

engine driving torque setting means for setting a driving torque of said engine based on the revolving speed of said drive shaft measured by said drive shaft revolving speed measuring means and the target torque set by said target torque setting means;

engine drive control means for controlling said engine so as to allow said engine to be driven with the driving torque set by said engine driving torque setting means;

lock-up state control means for controlling said clutch motor via said clutch motor-driving circuit, in order to make said clutch motor in a lock-up state wherein said second rotor is not rotated relative to said first rotor; and additional torque control means for controlling said assist motor via said assist motor-driving circuit by utilizing charge and discharge electric power of said storage battery, in order to enable a torque expressed as a difference between the target torque set by said target torque setting means and the driving torque set by said engine driving torque setting means to be applied by said assist motor to said output shaft of said engine via said first rotor.

19. A method of controlling a power output apparatus for outputting power to a drive shaft, said method comprising the steps of:

(a) providing an engine having an output shaft; and a clutch motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via the electromagnetic connection of said first and second rotors;

(b) measuring a relative position of said second rotor to said first rotor; and (c) controlling said clutch motor in order to make the relative position measured in said step (b) approach a predetermined position thereby making said clutch motor in a lock-up state wherein said second rotor is not rotated relative to said first rotor.

20. A method of controlling a power output apparatus for outputting power to a drive shaft, said method comprising the steps of:

(a) providing an engine having an output shaft; and a clutch motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via the electromagnetic connection of said first and second rotors;

(b) controlling said clutch motor in order to make the magnetism of magnetic poles produced on said first rotor and said second rotor of said clutch motor constant, thereby making said clutch motor in a lock-up state wherein said second rotor is not rotated relative to said first rotor.

21. A method of controlling a power output apparatus for outputting power to a drive shaft, said method comprising the steps of:

(a) providing an engine having an output shaft; a clutch motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via the electromagnetic connection of said first and second rotors; an assist motor connecting with said drive shaft; and a storage battery being charged with electric power regenerated by said assist motor and discharging electric power required to drive said assist motor, (b) setting a target torque, which is applied to said drive shaft, based on an instruction of a driver;

(c) measuring a revolving speed of said drive shaft;

(d) setting a driving torque of said engine based on the revolving speed of said drive shaft and the target torque, (e) controlling said engine so as to allow said engine to be driven with the driving torque;

(f) controlling said clutch motor in order to make said clutch motor in a lock-up state wherein said second rotor is not rotated relative to said first rotor; and (g) controlling said assist motor by utilizing charge and discharge electric power of said storage battery, in order to enable a torque expressed as a difference between the target torque and the driving torque to be applied by said assist motor to said drive shaft via said second rotor.

* * * * *